United States Patent
Tseng et al.

(10) Patent No.: US 12,193,074 B2
(45) Date of Patent: Jan. 7, 2025

(54) METHODS AND APPARATUSES FOR HANDLING CONFLICT BETWEEN SIDELINK DATA TRANSMISSION AND UPLINK SMALL DATA TRANSMISSION

(71) Applicant: SHARP KABUSHIKI KAISHA, Sakai (JP)

(72) Inventors: Yung-Lan Tseng, Taipei (TW); Mei-Ju Shih, Taipei (TW); Hung-Chen Chen, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 284 days.

(21) Appl. No.: 17/858,871

(22) Filed: Jul. 6, 2022

(65) Prior Publication Data

US 2023/0015859 A1    Jan. 19, 2023

Related U.S. Application Data

(60) Provisional application No. 63/219,758, filed on Jul. 8, 2021.

(51) Int. Cl.
| | | |
|---|---|---|
| *H04W 74/08* | (2024.01) | |
| *H04W 72/23* | (2023.01) | |
| *H04W 74/0833* | (2024.01) | |
| *H04W 76/20* | (2018.01) | |
| *H04W 92/18* | (2009.01) | |

(52) U.S. Cl.
CPC ....... *H04W 74/0841* (2013.01); *H04W 72/23* (2023.01); *H04W 74/0875* (2013.01); *H04W 76/20* (2018.02); *H04W 92/18* (2013.01)

(58) Field of Classification Search
CPC ............ H04W 74/0841; H04W 72/23; H04W 74/0875; H04W 76/20; H04W 92/18; H04W 72/115; H04W 72/40; H04W 74/0833; H04W 76/14; H04W 76/27; H04W 72/569
See application file for complete search history.

(56) References Cited

U.S. PATENT DOCUMENTS

| | | | | |
|---|---|---|---|---|
| 2023/0156853 | A1* | 5/2023 | Wang | .................... H04W 92/18 370/329 |
| 2024/0080833 | A1* | 3/2024 | Jeon | .................. H04W 28/0278 |

OTHER PUBLICATIONS

3GPP TS 36.331, "3rd Generation Partnership Project; Technical Specification Group Radio Access Network; Evolved Universal Terrestrial Radio Access (E-UTRA); Radio Resource Control (RRC); Protocol specification (Release 16)", V16.5.0 (Jun. 2021).

(Continued)

*Primary Examiner* — Hashim S Bhatti
(74) *Attorney, Agent, or Firm* — ScienBiziP, P.C.

(57) ABSTRACT

A method performed by a user equipment (UE) includes initiating a Small Data Transmission (SDT) procedure for transmitting a first set of data packets to a base station (BS) via an uplink (UL) transmission, determining, while the UE is in a Radio Resource Control (RRC) Inactive state, whether to prioritize the UL transmission over a sidelink (SL) transmission when there is a conflict between the UL transmission and the SL transmission during the SDT procedure, where the SL transmission is for transmitting a second set of data packets to another UE.

20 Claims, 14 Drawing Sheets

(56) References Cited

OTHER PUBLICATIONS

3GPP TS 38.213, "3rd Generation Partnership Project; Technical Specification Group Radio Access Network; NR; Physical layer procedures for control (Release 16)", V16.6.0 (Jun. 2021).
3GPP TS 38.321, "3rd Generation Partnership Project; Technical Specification Group Radio Access Network; NR; Medium Access Control (MAC) protocol specification (Release 16)", V16.5.0 (Jun. 2021).
3GPP TS 36.321, "3rd Generation Partnership Project; Technical Specification Group Radio Access Network; Evolved Universal Terrestrial Radio Access (E-UTRA); Medium Access Control (MAC) protocol specification (Release 16)", V16.5.0 (Jun. 2021).
3GPP TS 38.214, "3rd Generation Partnership Project; Technical Specification Group Radio Access Network; NR; Physical layer procedures for data (Release 16)", V16.2.0 (Jun. 2021).
3GPP TS 36.211, "3rd Generation Partnership Project; Technical Specification Group Radio Access Network; Evolved Universal Terrestrial Radio Access (E-UTRA); Physical channels and modulation (Release 16)", V16.6.0 (Jun. 2021).
3GPP TS 36.304, "3rd Generation Partnership Project; Technical Specification Group Radio Access Network; Evolved Universal Terrestrial Radio Access (E-UTRA); User Equipment (UE) procedures in idle mode (Release 16)", V16.3.0 (Dec. 2020).
3GPP TS 36.213, "3rd Generation Partnership Project; Technical Specification Group Radio Access Network; Evolved Universal Terrestrial Radio Access (E-UTRA); Physical layer procedures (Release 16)", V16.6.0 (Jun. 2021).
3GPP TS 38.211, "3rd Generation Partnership Project; Technical Specification Group Radio Access Network; NR; Physical channels and modulation (Release 16)", V16.6.0 (Jun. 2021).
3GPP TS 38.133, "3rd Generation Partnership Project; Technical Specification Group Radio Access Network; NR; Requirements for support of radio resource management (Release 16)", V16.7.0 (Mar. 2021).
3GPP TS 23.287, "3rd Generation Partnership Project; Technical Specification Group Services and System Aspects; Architecture enhancements for 5G System (5GS) to support Vehicle-to-Everything (V2X) services (Release 16)", V16.5.0 (Dec. 2020).
3GPP TS 38.331, "3rd Generation Partnership Project; Technical Specification Group Radio Access Network; NR; Radio Resource Control (RRC) protocol specification (Release 16)", V16.5.0 (Jun. 2021).
3GPP TS 38.215, "3rd Generation Partnership Project; Technical Specification Group Radio Access Network; NR; Physical layer measurements (Release 16)", V16.4.0 (Dec. 2020).
3GPP TS 38.304, "3rd Generation Partnership Project; Technical Specification Group Radio Access Network; NR; User Equipment (UE) procedures in Idle mode and RRC Inactive state (Release 16)", V16.5.0 (Jun. 2021).

* cited by examiner

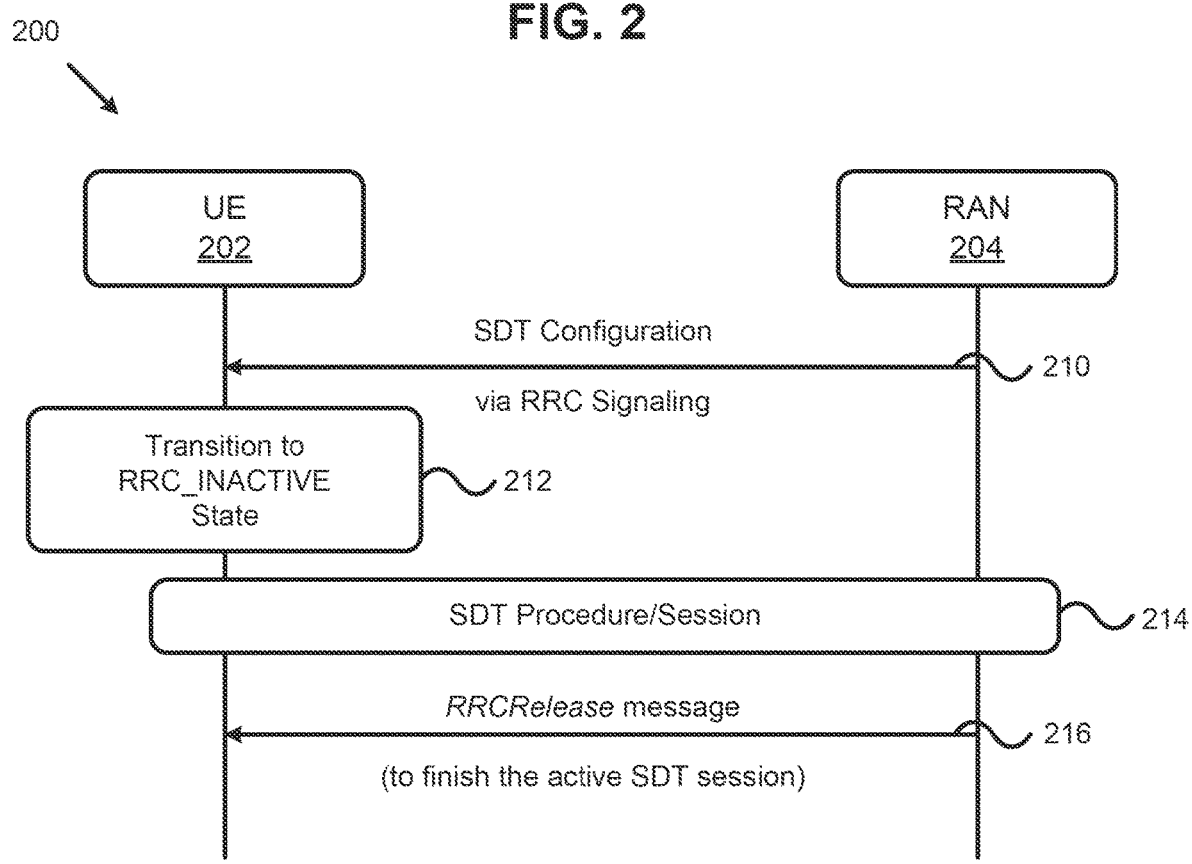

The quantity $N_{TA,SL}$ differs between channels and signals according to $$N_{TA,SL} = \begin{cases} N_{TA} & \text{for PSSCH in sidelink transmission mode 1} \\ 0 & \text{for all other cases} \end{cases}$$

902 — Initiate an SDT procedure for transmitting a first set of data packets to a BS via a UL transmission (e.g., the UL transmission being implemented on an E-UTRA or NR Uu interface)

904 — Initiate an SL transmission for transmitting a second set of data packets to another UE (e.g., the SL transmission being implemented on an E-UTRA or NR PC5 interface)

906 — Determine that the UE is not able to perform the UL transmission simultaneously with the SL transmission 908 — Determine whether to prioritize the UL transmission over the SL transmission while the UE is out of RRC_Connected state (e.g., E-UTRA/NR RRC_Inactive or E-UTRA/NR RRC_Idle), when there is a conflict between the UL transmission and the SL transmission (e.g., the UL transmission at least partially overlaps with the SL transmission in at least one physical resource, such as in time domain and/or frequency domain)

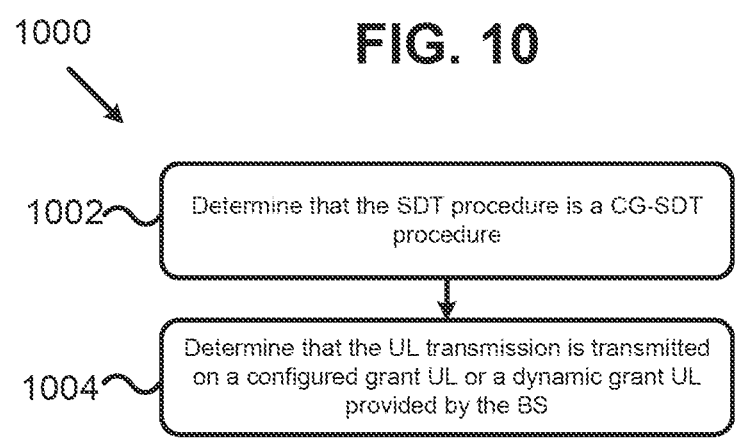
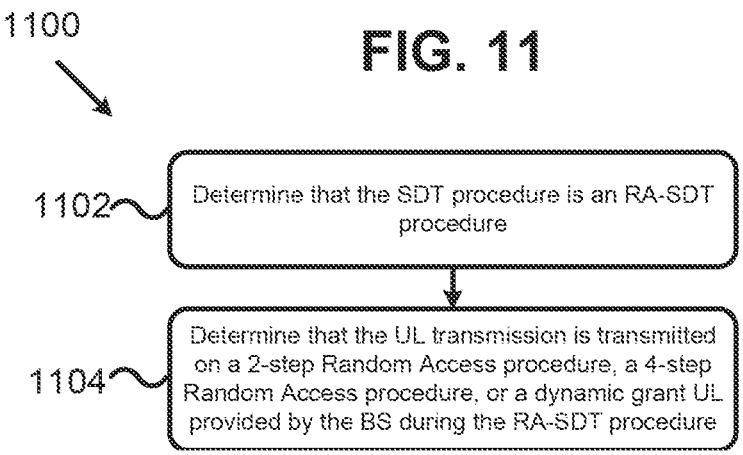

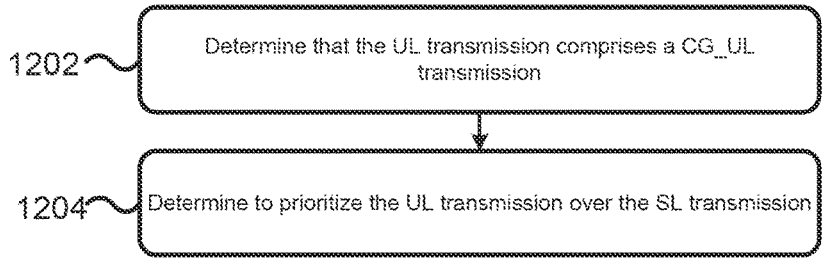
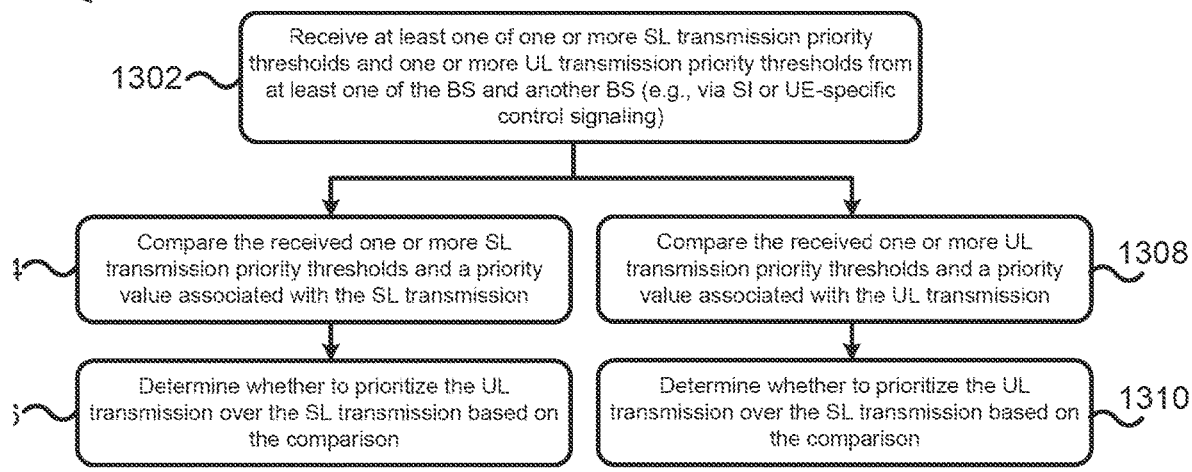

METHODS AND APPARATUSES FOR HANDLING CONFLICT BETWEEN SIDELINK DATA TRANSMISSION AND UPLINK SMALL DATA TRANSMISSION

CROSS-REFERENCE TO RELATED APPLICATION(S)

The present application claims the benefit of and priority to U.S. Provisional Patent Application Ser. No. 63/219,758, filed on Jul. 8, 2021, entitled "SIDELINK RADIO RESOURCE MANAGEMENT DURING IDLE MODE DATA TRANSMISSION PROCEDURE," the content of which is hereby incorporated herein fully by reference into the present application.

FIELD

The present disclosure generally relates to wireless communications and, more particularly, to radio resource management for small data and sidelink (SL) communications in the next generation wireless networks.

BACKGROUND

With the tremendous growth in the number of connected devices and the rapid increase in user/network traffic volume, various efforts have been made to improve different aspects of wireless communication for next-generation wireless communication systems (e.g., a fifth-generation (5G) New Radio (NR) wireless communication system). For example, small data transmission (SDT) will be supported in a 5G NR system to allow data and/or signaling transmissions while a user equipment (UE) is out of a radio resource control (RRC) Connected state. In addition, direct SL communications among two or more UEs without the participation of a base station will also be supported in a 5G NR system. Solutions to resolve conflicts between SDT and SL communications, however, have not yet been developed. Thus, there is a need for further improvements in wireless communication for the next-generation wireless communication systems.

SUMMARY

The present disclosure is directed to methods and apparatuses for handling conflict between sidelink data transmission and uplink small data transmission in the next generation wireless networks.

In a first aspect of the present disclosure, a method performed by a user equipment (UE) is provided. The method includes initiating a Small Data Transmission (SDT) procedure for transmitting a first set of data packets to a base station (BS) via an uplink (UL) transmission, and determining, while the UE is in a Radio Resource Control (RRC) Inactive state, whether to prioritize the UL transmission over a sidelink (SL) transmission when there is a conflict between the UL transmission and the SL transmission during the SDT procedure, where the SL transmission is for transmitting a second set of data packets to another UE.

In an implementation of the first aspect, the SDT procedure is a Configured Grant SDT (CG-SDT) procedure, and the UL transmission is transmitted on a configured grant UL or a dynamic grant UL provided by the BS.

In another implementation of the first aspect, the SDT procedure is a Random Access SDT (RA-SDT) procedure, and the UL transmission is transmitted on a 2-step Random Access procedure, a 4-step Random Access procedure, or a dynamic grant UL provided by the BS during the RA-SDT procedure.

In yet another implementation of the first aspect, the UL transmission is implemented on an Evolved Universal Terrestrial Radio Access (E-UTRA) Uu interface or a New Radio (NR) Uu interface, the SL transmission is implemented on an E-UTRA PC5 interface or an NR PC5 interface, and the UE is in an E-UTRA RRC Inactive state or an NR RRC Inactive state.

In yet another implementation of the first aspect, determining whether to prioritize the UL transmission over the SL transmission comprises determining to always prioritize the UL transmission over the SL transmission.

In yet another implementation of the first aspect, determining whether to prioritize the UL transmission over the SL transmission comprises determining to prioritize the UL transmission over the SL transmission when the UL transmission is a configured grant (CG)-UL transmission.

In yet another implementation of the first aspect, the method further comprises receiving one or more priority thresholds from at least one of the BS and another BS, where the one or more priority thresholds comprise one or more SL transmission priority thresholds, and where determining whether to prioritize the UL transmission over the SL transmission comprises prioritizing the SL transmission over the UL transmission or prioritizing the UL transmission over the SL transmission based on the one or more SL transmission priority thresholds and a priority value associated with the SL transmission.

In yet another implementation of the first aspect, the method further comprises receiving one or more priority thresholds from at least one of the BS and another BS, where the one or more priority thresholds comprise one or more UL transmission priority thresholds, and where determining whether to prioritize the UL transmission over the SL transmission comprises prioritizing the SL transmission over the UL transmission or prioritizing the UL transmission over the SL transmission based on the one or more UL transmission priority thresholds and a priority value associated with the UL transmission.

In yet another implementation of the first aspect, the method further comprises receiving one or more priority thresholds from at least one of the BS and another BS; wherein the UL transmission comprises a Random Access (RA)-UL transmission, and wherein determining whether to prioritize the UL transmission over the SL transmission comprises determining whether to prioritize the RA-UL transmission over the SL transmission based on the one or more priority thresholds.

In yet another implementation of the first aspect, the method further comprises receiving one or more priority thresholds from at least one of the BS and another BS; wherein the UL transmission comprises a Configured Grant (CG)-UL transmission, and wherein determining whether to prioritize the UL transmission over the SL transmission comprises determining to prioritize the CG-UL transmission over the SL transmission irrespective of the received one or more priority thresholds.

In a second aspect, a UE comprising one or more non-transitory computer-readable media having computer-executable instructions is provided. The processor is coupled to the one or more non-transitory computer-readable media, and configured to execute the computer-executable instructions to initiate a Small Data Transmission (SDT) procedure for transmitting a first set of data packets to a base station (BS) via an uplink (UL) transmission, and determine, while the UE is in a Radio Resource Control (RRC) Inactive state, whether to prioritize the UL transmission over a sidelink (SL) transmission when there is a conflict between the UL transmission and the SL transmission during the SDT procedure, where the SL transmission is for transmitting a second set of data packets to another UE.

In an implementation of the second aspect, the SDT procedure is a Configured Grant SDT (CG-SDT) procedure, and the UL transmission is transmitted on a configured grant UL or a dynamic grant UL provided by the BS.

In another implementation of the second aspect, the SDT procedure is a Random Access SDT (RA-SDT) procedure, and the UL transmission is transmitted on a 2-step Random Access procedure, a 4-step Random Access procedure, or a dynamic grant UL provided by the BS during the RA-SDT procedure.

In yet another implementation of the second aspect, the UL transmission is implemented on an Evolved Universal Terrestrial Radio Access (E-UTRA) Uu interface or a New Radio (NR) Uu interface, the SL transmission is implemented on an E-UTRA PC5 interface or an NR PC5 interface, and the UE is in an E-UTRA RRC Inactive state or an NR RRC Inactive state.

In yet another implementation of the second aspect, determining whether to prioritize the UL transmission over the SL transmission comprises determining to always prioritize the UL transmission over the SL transmission.

In yet another implementation of the second aspect, determining whether to prioritize the UL transmission over the SL transmission comprises determining to prioritize the UL transmission over the SL transmission when the UL transmission is a configured grant (CG)-UL transmission.

In yet another implementation of the second aspect, the at least one processor is further configured to execute the computer-executable instructions to receive one or more priority thresholds from at least one of the BS and another BS, where the one or more priority thresholds comprise one or more SL transmission priority thresholds, and where determining whether to prioritize the UL transmission over the SL transmission comprises prioritizing the SL transmission over the UL transmission or prioritizing the UL transmission over the SL transmission based on the one or more SL transmission priority thresholds and a priority value associated with the SL transmission.

In yet another implementation of the second aspect, the at least one processor is further configured to execute the computer-executable instructions to receive one or more priority thresholds from at least one of the BS and another BS, where the one or more priority thresholds comprise one or more UL transmission priority thresholds, and where determining whether to prioritize the UL transmission over the SL transmission comprises prioritizing the SL transmission over the UL transmission or prioritizing the UL transmission over the SL transmission based on the one or more UL transmission priority thresholds and a priority value associated with the UL transmission.

In yet another implementation of the second aspect, the at least one processor is further configured to execute the computer-executable instructions to receive one or more priority thresholds from at least one of the BS and another BS, where the UL transmission comprises a Random Access (RA)-UL transmission, and where determining whether to prioritize the UL transmission over the SL transmission comprises determining whether to prioritize the RA-UL transmission over the SL transmission based on the one or more priority thresholds.

In yet another implementation of the second aspect, the at least one processor is further configured to execute the computer-executable instructions to receive one or more priority thresholds from at least one of the BS and another BS, where the UL transmission comprises a Configured Grant (CG)-UL transmission, and where determining whether to prioritize the UL transmission over the SL transmission comprises determining to prioritize the CG-UL transmission over the SL transmission irrespective of the received one or more priority thresholds.

BRIEF DESCRIPTION OF THE DRAWINGS

Aspects of the exemplary disclosure are best understood from the following detailed description when read with the accompanying figures. Various features are not drawn to scale, and dimensions of various features may be arbitrarily increased or reduced for clarity of discussion.

FIG. 2 illustrates a diagram of an SDT configuration and an SDT procedure, according to an example embodiment of the present disclosure.

FIG. 9 illustrates a flowchart illustrating a method/process performed by a UE for determining whether to prioritize a UL transmission over an SL transmission while the UE is out of RRC_Connected state, according to an example implementation of the present disclosure.

FIG. 10 illustrates a flowchart illustrating a method/process performed by a UE for determining whether to prioritize a UL transmission over an SL transmission while the UE is out of RRC_Connected state, according to an example implementation of the present disclosure.

FIG. 11 illustrates a flowchart illustrating a method/process performed by a UE for determining whether to prioritize a UL transmission over an SL transmission while the UE is out of RRC_Connected state, according to an example implementation of the present disclosure.

FIG. 12 illustrates a flowchart illustrating a method/process performed by a UE for determining whether to prioritize a UL transmission over an SL transmission while the UE is out of RRC_Connected state, according to an example implementation of the present disclosure.

FIG. 13 illustrates a flowchart illustrating a method/process performed by a UE for determining whether to prioritize a UL transmission over an SL transmission while the UE is out of RRC_Connected state, according to an example implementation of the present disclosure.

CITATIONS

Figure 1:
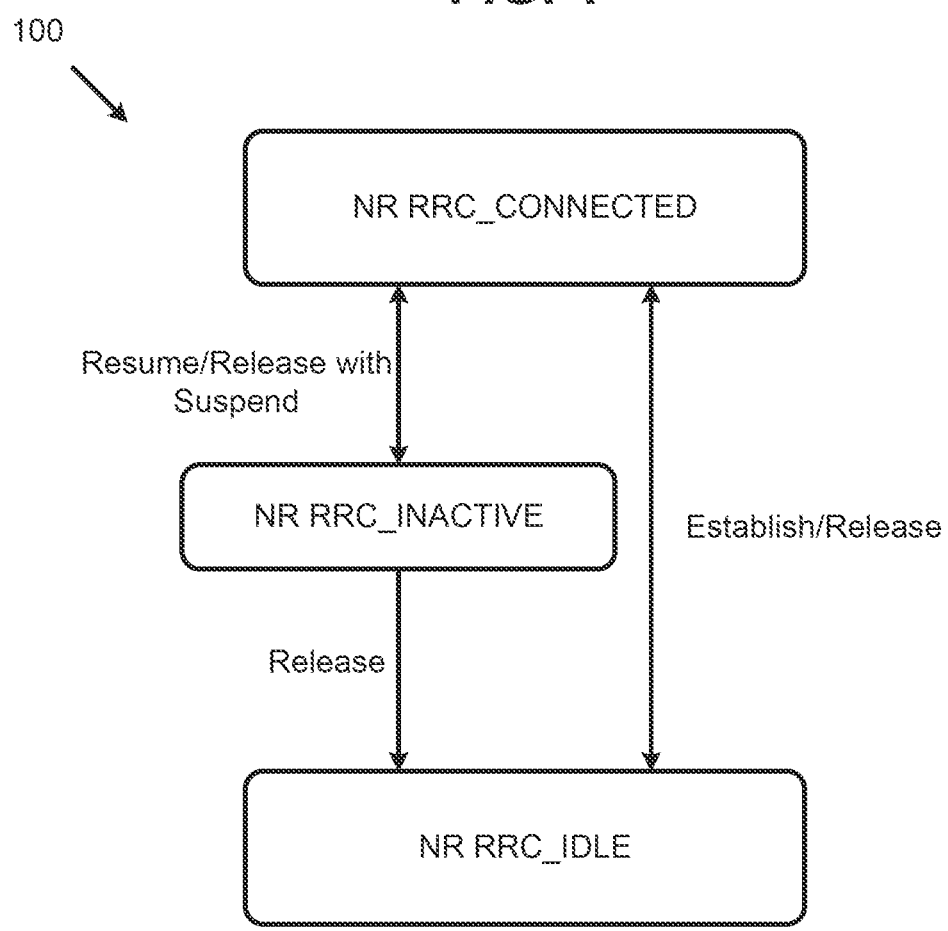
FIG. 1 illustrates a diagram of an overview of an RRC state machine and state transitions in an NR system, according to an example embodiment of the present disclosure.

Citation 1—3GPP TS 38.213 v16.6.0 (2021-06).
Citation 2—3GPP TS 38.321 v16.5.0 (2021-07).
Citation 3—TS 23.287 v16.5.0 (2020-12).
Citation 4—3GPP TS 36.321 v16.5.0 (2021-07).
Citation 5—3GPP TS 38.214 v16.6.0 (2021-06).
Citation 6—3GPP TS 38.211 v16.6.0 (2021-06).
Citation 7—3GPP TS 38.133 v16.7.0 (2021-04).
Citation 8—3GPP TS 38.304 v16.5.0 (2021-07).
Citation 9—3GPP TS 38.211 v15.7.0 (2019-09).
Citation 10—3GPP TS 36.304 v16.3.0 (2021-01).
Citation 11—3GPP TS 36.213 v16.6.0 (2021-06).
Citation 12—3GPP TS 36.211 v16.6.0 (2021-06).
Citation 13—3GPP TS 36.331 v16.5.0 (2021-07).
Citation 14—3GPP TS 38.331 v16.5.0 (2021-07).

DETAILED DESCRIPTION

Some of the acronyms in the present disclosure are defined as follows and unless otherwise specified, the acronyms have the following meanings:

| Acronym | Full name |
| --- | --- |
| 3GPP | $3^{rd}$ Generation Partnership Project |
| 5GC | 5G Core |
| ACK | Acknowledgement |
| AMF | Access and Mobility Management Function |
| ARQ | Automatic Repeat Request |
| AM | Access Mode |
| AS | Access Stratum |
| BCCH | Broadcast Control Channel |
| BCH | Broadcast Channel |
| BFR | Beam Failure Recovery |
| BS | Base Station |
| BSR | Buffer Status Report |
| BWP | Bandwidth Part |
| CA | Carrier Aggregation |
| CAG | Closed Access Group |
| CAG-ID | Closed Access Group Identifier |
| CBRA | Contention Based Random Access |
| CFRA | Contention Free Random Access |
| CG | Configured Grant |
| CM | Connection Management |
| CMAS | Commercial Mobile Alert System |
| CN | Core Network |
| C-RNTI | Cell Radio Network Temporary Identifier |
| CS-RNTI | Configured Scheduling Radio Network Temporary Identifier |
| CSI-RS | Channel State Information Reference Signal |
| DCI | Downlink Control Information |
| DL | Downlink |
| DRB | Data Radio Bearer |
| DRX | Discontinuous Reception |
| ETWS | Earthquake and Tsunami Warning System |
| E-UTRA | Evolved UMTS Terrestrial Radio Access |
| E-UTRAN | Evolved UMTS Terrestrial Radio Access Network |
| HARQ | Hybrid Automatic Repeat Request |
| HRNN | Human-Readable Network Name |
| IE | Information Element |
| IMSI | International Mobile Subscriber Identity |
| LCH | Logical Channel |
| LCG | Logical Channel Group |
| LCP | Logical Channel Prioritization |
| MAC | Medium Access Control |
| MCC | Mobile Country Code |
| MIB | Master Information Block |
| MICO | Mobile Initiated Connection Only |
| MSG | Message |
| NAS | Non-Access Stratum |
| NG-RAN | Next-Generation Radio Access Network |
| NID | Network Identifier |
| NPN | Non-Public Network |
| NR | New Radio |
| NW | Network |
| PCell | Primary Cell |
| PCCH | Paging Control Channel |
| PDCCH | Physical Downlink Control Channel |
| PDCP | Packet Data Convergence Protocol |
| PDU | Protocol Data Unit |
| PF | Paging Frame |
| PLMN | Public Land Mobile Network |
| PO | Paging Occasion |
| PRACH | Physical Random Access Channel |
| PUCCH | Physical Uplink Control Channel |
| PUSCH | Physical Uplink Shared Channel |
| PLMN | Public Land Mobile Network |
| QoS | Quality of Service |
| RA | Random Access |
| RACH | Random Access Channel |
| RAN | Radio Access Network |
| RAT | Radio Access Technology |
| RB | Radio Bearer |
| Rel | Release |
| RLC | Radio Link Control |
| RNA | RAN-based Notification Area |
| RNAU | RAN-based Notification Area Update |
| RNTI | Radio Network Temporary Identifier |
| RRC | Radio Resource Control |
| RSRP | Reference Signal Receiving Power |
| SCell | Secondary Cell |
| SCG | Secondary Cell Group |
| SCS | Sub Carrier Spacing |
| SNPN | Stand-alone Non-Public Network |
| SDT | Small Data Transmission |
| SDU | Service Data Unit |
| SFN | System Frame Number |
| SI | System Information |
| SIB | System Information Block |
| SINR | Signal to Interference plus Noise Ratio |
| SL | Sidelink |
| SLIV | Start and Length Indicator |
| SNPN | Stand-alone Non-Public Network |
| SR | Scheduling Request |
| SRB | Signaling Radio Bearer |
| SSB | Synchronization Signal Block |
| S-TMSI | SAE-Temporary Mobile Subscriber Identity |
| SUL | Supplementary Uplink |
| TA | Timing Advance or Time Alignment |
| TAG | Timing Advance Group |
| TS | Technical Specification |
| UAC | Unified Access Control |
| UE | User Equipment |
| UL | Uplink |
| UMTS | Universal Mobile Telecommunications System |
| UPF | User Plane Function |

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not shown) by the same numerals in the example figures. However, the features in different implementations may differ in other respects, and thus may not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Additionally, for the purposes of explanation and non-limitation, specific details, such as functional entities, techniques, protocols, standard, and the like are set forth for providing an understanding of the described technology. In other examples, detailed descriptions of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software, or a combination of software and hardware. Described functions may correspond to modules which may be software, hardware, firmware, or any combination thereof. The software implementation may comprise computer executable instructions stored on a computer-readable medium, such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of one or more Application-Specific Integrated Circuits (ASICs), programmable logic arrays, and/or one or more Digital Signal Processor (DSPs). Although some of the example implementations described in this specification are oriented to software installed and executing on computer hardware, nevertheless, alternative example implementations implemented as firmware, as hardware, or as a combination of hardware and software are well within the scope of the present disclosure.

The computer-readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G NR Radio Access Network (RAN)) typically includes at least one base station, at least one UE, and one or more optional network elements that provide connection towards a network. The UE communicates with the network (e.g., a Core Network (CN), an Evolved Packet Core (EPC) network, an Evolved Universal Terrestrial Radio Access network (E-UTRAN), a 5G Core (5GC), or an internet), through a RAN established by one or more base stations.

It should be noted that, in the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A base station may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic wideband-code division multiple access (W-CDMA), high-speed packet access (HSPA), LTE, LTE-A, eLTE (evolved LTE, e.g., LTE connected to 5GC), NR (often referred to as 5G), and/or LTE-A Pro. However, the scope of the present disclosure should not be limited to the above-mentioned protocols.

A base station may include, but is not limited to, a node B (NB) as in the UNITS, an evolved node B (eNB) as in the LTE or LTE-A, a radio network controller (RNC) as in the UNITS, a base station controller (BSC) as in the GSM/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the 5GC, a next-generation Node B (gNB) as in the 5G Access Network (5G-AN), and any other apparatus capable of controlling radio communication and managing radio resources within a cell. The BS may connect to serve the one or more UEs through a radio interface to the network.

The base station may be operable to provide radio coverage to a specific geographical area using a plurality of cells included in the RAN. The BS may support the operations of the cells. Each cell may be operable to provide services to at least one UE within its radio coverage. Specifically, each cell (often referred to as a serving cell) may provide services to serve one or more UEs within its radio coverage (e.g., each cell schedules the Downlink (DL) and optionally Uplink (UL) resources to at least one UE within its radio coverage for DL and optionally UL packet transmission). The BS may communicate with one or more UEs in the radio communication system through the plurality of cells.

A cell may allocate SL (SL) resources for supporting Proximity Service (ProSe) or Vehicle to Everything (V2X) services. Each cell may have overlapped coverage areas with other cells. In Multi-RAT Dual Connectivity (MR-DC)

cases, the primary cell of a Master Cell Group (MCG) or a Secondary Cell Group (SCG) may be referred to as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, SL resources may also be provided in an NR frame to support ProSe services, (E-UTRA/NR) SL services, or (E-UTRA/NR) V2X services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, or B exists alone. In addition, the character "/" herein generally represents that the former and latter associated objects are in an "or" relationship.

As discussed above, the next-generation (e.g., 5G NR) wireless network is envisioned to support more capacity, data, and services. A UE configured with multi-connectivity may connect to a Master Node (MN) as an anchor and one or more Secondary Nodes (SNs) for data delivery. Each one of these nodes may be formed by a cell group that includes one or more cells. For example, a Master Cell Group (MCG) may be formed by an MN, and a Secondary Cell Group (SCG) may be formed by an SN. In other words, for a UE configured with dual connectivity (DC), the MCG is a set of one or more serving cells including the PCell and zero or more secondary cells. Conversely, the SCG is a set of one or more serving cells including the PSCell and zero or more secondary cells.

As also described above, the Primary Cell (PCell) may be an MCG cell that operates on the primary frequency, in which the UE either performs the initial connection establishment procedure or initiates the connection reestablishment procedure. In the MR-DC mode, the PCell may belong to the MN. The Primary SCG Cell (PSCell) may be an SCG cell in which the UE performs random access (e.g., when performing the reconfiguration with a sync procedure). In MR-DC, the PSCell may belong to the SN. A Special Cell (SpCell) may be referred to a PCell of the MCG, or a PSCell of the SCG, depending on whether the Medium Access Control (MAC) entity is associated with the MCG or the SCG. Otherwise, the term Special Cell may refer to the PCell. A Special Cell may support a Physical Uplink Control Channel (PUCCH) transmission and contention-based Random Access, and may always be activated. Additionally, for a UE in an RRC_CONNECTED state (also be referred as "RRC Connected state") that is not configured with the CA/DC, may communicate with only one serving cell (SCell) which may be the primary cell. Conversely, for a UE in the RRC_CONNECTED state that is configured with the CA/DC a set of serving cells including the special cell(s) and all of the secondary cells may communicate with the UE.

Examples of some of the terms and their corresponding definitions used in the present disclosure are provided below.

Acceptable Cell: an acceptable cell is a cell on which the UE may camp to obtain limited services (e.g., such as originating emergency calls, receiving ETWS and CMAS notifications, etc.). An acceptable cell may fulfil different requirements, in a minimum set of requirements to initiate an emergency call and to receive ETWS and CMAS notifications in an NR network. The requirements may include the acceptable cell not being barred and the acceptable cell selection criteria being fulfilled (e.g., see 3GPP TS 38.304). If a UE has an ongoing emergency call, all acceptable cells of the corresponding PLMN are treated as suitable for the duration of the emergency call.

Allowed CAG list: a list that includes a per-PLMN list of CAG Identifiers that the UE may be allowed to access (e.g., see 3GPP TS 23.501).

Available PLMN(s): includes a list of one or more PLMNs for which the UE has found at least one cell and has read its PLMN identity(ies).

Barred Cell: a cell on which a UE is not allowed to camp. A cell is barred if it is so indicated in the system information (e.g., as specified in 3GPP TS 38.331).

CAG cell: a cell that is broadcasting at least one Closed Access Group (CAG) Identifier (ID).

CAG Member Cell: for a UE, a cell that is broadcasting the identity of the selected PLMN, registered PLMN, or equivalent PLMN, and the cell that is broadcasting a CAG identifier belonging to the Allowed CAG list of the UE for that PLMN.

CAG-only cell: a cell that provides access only to CAG cells.

Camped on a cell: after a UE has completed a cell selection/reselection process and has chosen a cell, the UE camps on the cell and monitors system information and (in most cases) paging information received from the camped cell.

Camped on any cell: when a UE is in an idle state and has completed a cell selection/reselection process and has chosen a cell irrespective of the PLMN identity. A UE may camp on a cell that belongs to a registration area that is forbidden for regional provision of service. A cell that belongs to a registration area that is forbidden for regional provision service (e.g., see 3GPP TS 23.122 and TS 24.501) is suitable, but provides only limited service.

CAG Identifier: identifies a CAG within a PLMN.

Commercial Mobile Alert System: a Public Warning System (PWS) that delivers warning notifications provided by warning notification providers to CMAS capable UEs.

EHPLMN: any of the PLMN entries contained in an Equivalent HPLMN list (e.g., see TS 23.122).

Equivalent PLMN list: a list of PLMNs that is considered as an equivalent by the UE for cell selection, cell reselection, and handover according to the information provided by the NAS.

Home PLMN: a PLMN where the Mobile Country Code (MCC) and Mobile Network Code (MNC) of the PLMN identity are the same as the MCC and MNC of the IMSI.

Network Identifier: identifies an SNPN in combination with a PLMN ID (e.g., see TS 23.501).

Non-Public Network: a network deployed for non-public use (e.g., see 3GPP Technical Specification TS 22.261).

Process: a local action or a combination of actions in the UE that is/are invoked by an RRC procedure or an RRC_IDLE procedure or an RRC_INACTIVE state procedure. A UE is not required to support manual search and selection of PLMN or CAG or SNPN while the UE is in an RRC CONNECTED state. The UE may use local release of RRC connection to perform manual search if it is not possible to perform the search while in the RRC connected state.

Radio Access Technology: is a type of technology that is used for radio access (e.g., NR or E-UTRA).

Registration Area: (NAS) registration area is an area in which the UE may roam without a need to perform location registration (e.g., often a NAS procedure).

Registered PLMN: a PLMN on which certain Location Registration outcomes have occurred (e.g., as specified in TS 23.122).

Registered SNPN: an SNPN on which certain Location Registration outcomes have occurred (e.g., as specified in TS 23.122).

Reserved Cell: a cell on which camping is not allowed, except for particular UEs, if so indicated in the system information (e.g., as specified in TS 38.331).

Selected PLMN: is the PLMN that has been selected by the NAS layer, either manually or automatically.

Selected SNPN: is the SNPN that has been selected by the NAS layer, either manually or automatically.

Serving cell: a cell on which the UE is camped.

SNPN Access Mode: is mode of operation where the UE only selects SNPNs (e.g., as defined in TS 23.501).

SNPN identity: an identifier of an SNPN comprising of a PLMN ID and an MD combination.

SNPN-only cell: a cell that provides access only to SNPNs.

Strongest cell: a cell on a particular frequency that is considered strongest according to the layer 1 cell search procedure (e.g., see TS 38.213 and TS 38.215).

Suitable Cell: for a UE that is not operating in SNPN Access Mode, a cell is considered as suitable if the following conditions are fulfilled: (1) the cell is part of either the selected PLMN or the registered PLMN or PLMN of the Equivalent PLMN list, and for that PLMN either the PLMN-ID of that PLMN is broadcast by the cell with no associated CAG-IDs and CAG-only indication in the UE for that PLMN (e.g., as indicated in 3GPP TS 23.501) is absent or false; (2) the allowed CAG list that is in the UE for that PLMN (e.g., as indicated in 3GPP TS 23.501) includes a CAG-ID broadcast by the cell for that PLMN; (3) the cell selection criteria are fulfilled (e.g., 3GPP TS 38.304); (4) according to the latest information provided by the NAS layer, the cell is not barred (e.g., see 3GPP TS 38.304) and/or the cell is part of at least one TA that is not part of the list of "Forbidden Tracking Areas" (e.g., as indicated in 3GPP TS 22.261), which belongs to either the selected SNPN or the registered SNPN of the UE.

Citation 1 above describes certain prioritization rules for simultaneous SL and UL transmissions or receptions. According to Citation 1, if a UE would simultaneously transmit (e.g., data packets) on the UL and on the SL of a serving cell, and the UE is not capable of simultaneous transmissions on the UL and on the SL of the serving cell, the UE transmits only on the link, UL or SL, with the higher priority.

According to Citation 1, if a UE would simultaneously transmit on the UL and receive on the SL in a carrier, the UE transmits on the UL or receives on the SL, with the higher priority.

According to Citation 1, if a UE is capable of simultaneous transmissions on the UL and on the SL of two respective carriers of a serving cell, or of two respective serving cells, the UE would transmit on the UL and on the SL of the two respective carriers of the serving cell, or of the two respective serving cells. The transmission on the UL would overlap with the transmission on the SL over a time period, and the total UE transmission power over the time period would exceed $C_{MAX}$.

The UE reduces the power for the UL transmission prior to the start of the UL transmission, if the SL transmission has higher priority than the UL transmission as determined in Clause 16.2.4.3.1 of Citation 1, so that the total UE transmission power would not exceed $C_{MAX}$.

The UE reduces the power for the SL transmission prior to the start of the SL transmission, if the UL transmission has higher priority than the SL transmission as determined in Clause 16.2.4.3.1, so that the total UE transmission power would not exceed $C_{MAX}$.

Citation 2 describes certain prioritization rules for simultaneous SL and UL transmissions/receptions in the MAC entity. According to Citation 2, the transmission of the MAC PDU is prioritized over UL transmissions of the MAC entity or the other MAC entity if the following conditions are met: (1) if the MAC entity is not able to perform this SL transmission simultaneously with all UL transmissions at the time of the transmission; and (2) if UL transmission is neither prioritized as specified in clause 5.4.2.2 nor prioritized by upper layer according to Citation 3 and (3) if sl-PrioritizationThres is configured and if the value of the highest priority of logical channel(s) or a MAC CE in the MAC PDU is lower than sl-PrioritizationThres. It should be noted that if the MAC entity is not able to perform this SL transmission simultaneously with all UL transmissions as specified in clause 5.4.2.2 of TS Citation 3 at the time of the transmission, and prioritization-related information is not available prior to the time of this SL transmission due to processing time restriction, it is up to UE implementation whether this SL transmission is performed.

A 5G NR wireless communication system supports SDT to allow data and/or signaling transmissions while a user equipment (UE) is out of an RRC_Connected state (e.g., in an RRC_Inactive (also be referred as "RRC Inactive state") or RRC_Idle state (also be referred as "RRC Idle state")). UEs with infrequent (e.g., periodic and/or non-periodic) data transmissions are generally maintained by the network in the RRC_Inactive state. Before Rel-16, the RRC_Inactive state did not support data transmission. Hence, the UE had to resume the connection (e.g., move to an RRC_Connected state) for any DL reception and/or UL data transmission. Connection setup and subsequent release to an RRC_Inactive state had to happen for each data transmission regardless of how small and infrequent the data packets were. This resulted in unnecessary power consumption and signaling overhead.

Signaling overhead from RRC_Inactive state UEs due to transmission of small data packets is a general problem and will become a critical issue as the number of UEs increases in NR not only for network performance and efficiency but also for the battery performance of the UEs. In general, any device that has intermittent small data packets in INACTIVE state will benefit from enabling small data transmission in the RRC_Inactive state.

The key enablers for small data transmission in NR, namely the RRC_Inactive state, 2-step, 4-step RACH and configured grant type-1 have already been specified as part of legacy designs. The present disclosure provides efficient mechanisms for small data transmission in the RRC_Inactive state for NR.

The RRC_Inactive state is a state in which a UE may remain in CM-CONNECTED (e.g., a UE state associated with the UE's registered Core Network) and may move within an area configured by NG-RAN (the RNA) without notifying NG-RAN. In RRC_Inactive state, the last serving gNB node keeps the UE context and the UE-associated NG connection with the serving AMF and UPF.

FIG. 1 illustrates a diagram 100 of an overview of an RRC state machine and state transitions in an NR system, according to an implementation of the present disclosure. A UE has only one RRC state at a time in NR. RRC_Inactive state may support at least the following functions, PLMN selection, broadcast of system information, cell re-selection mobility, paging initiated by NG-RAN (RAN paging), RAN-based notification area (RNA) managed by NG-RAN, DRX for RAN paging configured by NG-RAN, 5GC-NG-RAN connection (both C/U-planes) established for UE, the UE (Inactive) AS context stored in NG-RAN and the UE, NG-RAN knows the RNA which the UE belongs to, and etc.

For NR connected to 5GC, the UE identity "I-RNTI" may be used to identify the UE context in the RRC_Inactive state. The I-RNTI provides the new NG-RAN node a reference to the UE context in the old NG-RAN node. How the new NG-RAN node is able to resolve the old NG-RAN ID from the I-RNTI is a matter of proper configuration in the old and new NG-RAN node. Some typical partitioning of a 40-bit I-RNTI assumes the following contents:

UE specific reference: reference to the UE context within a logical NG-RAN node;

NG-RAN node address index: information to identify the NG-RAN node that has allocated the UE specific part;

PLMN-specific information: information supporting network sharing deployments, providing an index to the PLMN ID part of the Global NG-RAN node identifier.

SNPN-specific information: SNPN may be a small PLMN configured by the operator. Each SNPN may be identified by a unique SNPN identity (e.g., an identifier of an SNPN comprising of a PLMN ID and an MD combination). A configured grant configuration may be associated with an SNPN ID.

UE Inactive AS context is stored when the connection is suspended (when the UE is in the RRC_Inactive state) and restored when the connection is resumed (e.g., when the UE is transited from RRC_Inactive to the RRC_Connected state).

The suspension of the RRC connection is initiated by the network. When the RRC connection is suspended, the UE stores the UE Inactive AS context and any configuration received from the network, and transits to the RRC_Inactive state. If the UE is configured with SCG, the UE releases the SCG configuration upon initiating an RRC Connection Resume procedure. The RRC message to suspend the RRC connection is integrity protected and ciphered. The resumption of a suspended RRC connection is initiated by upper layers when the UE needs to transit from RRC_Inactive state to the RRC_Connected state or by RRC layer to perform an RNA update or by RAN paging from NG-RAN. When the RRC connection is resumed, the network configures the UE according to the RRC connection resume procedure based on the stored UE Inactive AS context and any RRC configuration received from the network. The RRC connection resume procedure re-activates AS security and re-establishes SRB(s) and DRB(s).

In response to a request to resume the RRC connection, the network may resume the suspended RRC connection and send UE to the RRC_Connected, or reject the request to resume and send UE to the RRC_Inactive state (with a wait timer), or directly re-suspend the RRC connection and send UE to the RRC_Inactive state, or directly release the RRC connection and send UE to the RRC_Idle state, or instruct the UE to initiate NAS level recovery (in this case the network sends an RRC setup message).

In addition, in the RRC_Inactive state, a UE specific DRX may be configured by upper layers or by RRC layer, UE controlled mobility is based on network configuration, the UE stores the UE Inactive AS context, and a RAN-based notification area is configured by the RRC entity or RRC layer.

Furthermore, the UE, in the RRC_Inactive state, may perform the following:

Monitoring Short Messages transmitted with P-RNTI over DCI;

Monitoring a Paging channel for CN paging using 5G-S-TMSI and RAN paging using full I-RNTI;

Performing neighboring cell measurements and cell (re-) selection;

Performing RAN-based notification area updates periodically and when moving outside the configured RAN-based notification area;

Acquiring system information and then sending an SI request (if configured).

FIG. 2 illustrates a diagram of an SDT configuration and an SDT procedure (also referred to as an "SDT session"), according to an implementation of the present disclosure. As shown in diagram 200 of FIG. 2, in action 210, the UE 202 may receive an SDT configuration via DL UE-specific signaling (e.g., RRCReconfiguration message and/or RRCRelease message) from the serving radio access network (RAN) 204, such as a first serving cell associated with the UE 202. The first serving cell may configure UL-CG configuration (or CG-PUSCH resource configurations) and/or (UE-specific/common (or cell-specific)) random access resources for the UE 202 to implement small data transmission after the UE 202 moves to an RRC_Inactive state. In some implementations, the CG-PUSCH resource and/or the RA resource configuration may locate on (normal) UL carrier (e.g., UL carrier or NUL carrier) and/or supplementary uplink carrier (e.g., SUL carrier). Then, after receiving the SDT configuration (while the UE 202 is staying in the RRC_Connected state), in action 212, the UE 202 may store the SDT configuration after the UE 202 moves to the RRC_Inactive state (e.g., after receiving the RRCRelease message (the first RRCRelease message) from the first serving cell, which instructs the UE to move to the RRC Inactive state). In action 214, as some packets (belong to the SDT radio bearers, which may also be configured in the SDT configuration) arrive, the UE 202 may start an SDT procedure or session accordingly (e.g., by transmitting the encoded packets on the configured UL-CG configuration directly with or without transmitting the RRCResume Request message, or by transmitting a preamble firstly with or without attaching an encoded packet during a 2-step triggered as part of the SDT procedure, or by transmitting a preamble as MSG1 and the following RRCResumeRequest message or encoded packet in a 4-step RA procedure) with the second serving cell. It should be noted that the second serving cell may be the same with the first serving cell in some scenarios, but the second serving cell may be different from the first serving cell in some other scenarios. After an SDT procedure is initiated, the serving cell (e.g., the first or second serving cell) may continue the small data transmission by transmitting DL packets to the UE 202 or providing dynamic UL grants to the UE for the subsequent DL or UL packet exchanges. It should be noted that HARQ protocols may be configured as part of the SDT configuration and be implemented in DL or UL packet exchange during the SDT procedure.

To finish the active SDT procedure, in action 216, the second serving cell may transmit another RRCRelease message (e.g., a second RRCRelease message) to instructs the UE 202 to finish the SDT procedure. The UE 202 may keep the stored SDT configuration and stay in the RRC_Inactive state after receiving the second RRCRelease message to finish the active SDT procedure.

It should be noted that, in various implementations of the present disclosure, an (RRC-based) SDT procedure may include the following actions. In some implementations, the UE may transmit an RRCResumeRequest message (with or without UL (SDT) packet) via MSGA/MSG3 (e.g., during a 2-step/4-step RA procedure to initiate an RA-SDT procedure) or via a UL configured grant (to initiate a CG-SDT procedure). Then, after the SDT procedure is initiated by the RRCResumeRequest message transmission, the serving cell may continue/prolong the SDT procedure by further delivering DL dynamic assignment(s)/grant(s) and/or UL dynamic grant(s) to the UE (e.g., via Downlink Control Information) for more DL/UL packet exchange during the SDT procedure (which may also be known as subsequent packet transmission/reception during the SDT procedure). Then, the serving cell may transmit DL RRC signaling (e.g., an RRCRelease message) to the UE to stop, finish, or interrupt the SDT procedure. Thereafter, the UE may stop the SDT procedure, for example, after receiving an RRCRelease message from the serving cell. It should be noted that, in some other implementations, the UE may start an (RRC-less) SDT procedure by transmitting UL (SDT) packets without an RRCResumeRequest message, and the subsequent DL or UL packet exchanges may also happen to an RRC-less SDT procedure. In addition, the serving cell may also transmit an RRCRelease message to terminate an RRC-less SDT procedure. It should be noted that, the DL/UL HARQ feedback transmission or reception for the initiated UL (SDT) packet transmission and the subsequent DL or UL packet exchange may also be included as part of the SDT procedure.

UL configuration grant configuration (for SDT configuration) and CG-SDT procedure are described below.

For UL transmissions, a base station (e.g., a gNB) may dynamically allocate resources to UEs via the C-RNTI(s) on PDCCH(s). A UE may always monitor the PDCCH(s) in order to find possible grants for UL transmission when its downlink reception is enabled (e.g., activity governed by DRX when configured). When CA is configured, the same C-RNTI may apply to all the serving cells.

In addition, with configured grants, the gNB may allocate UL resources for the initial HARQ transmissions to the UEs. Two types (Type 1 and Type 2) of configured UL grants are defined. With Type 1, RRC directly provides the configured UL grant (including the periodicity). With Type 2, RRC defines the periodicity of the configured UL grant while a PDCCH addressed to CS-RNTI may either signal and activate the configured UL grant, or deactivate it. For example, a PDCCH addressed to CS-RNTI indicates that the UL grant may be implicitly reused according to the periodicity defined by RRC, until deactivated.

Type 1 and Type 2 are configured by the RRC entity or layer per serving cell and per BWP. Multiple configurations may be active simultaneously only on different serving cells. For Type 2, activation and deactivation are independent among the serving cells. For the same serving cell, the MAC entity is configured with either Type 1 or Type 2.

RRC configures the following parameters when the configured grant Type 1 is configured:
cs-RNTI: CS-RNTI for retransmission;
periodicity: periodicity of the configured grant Type 1;
timeDomainOffset: Offset of a resource with respect to SFN=0 in time domain;
timeDomainAllocation: Allocation of configured uplink grant in time domain which contains startSymbolAndLength (i.e. SLIV in Citation 5);
nrofHARQ-Processes: the number of HARQ processes for configured grant.

Upon configuration of a configured grant Type 1 for a serving cell by upper layers, the MAC entity shall: store the UL grant provided by upper layers as a configured UL grant for the indicated serving cell; initialize or re-initialize the configured UL grant to start in the symbol according to timeDomainOffset and S (derived from SLIV as specified in Citation 5), and to reoccur with periodicity.

Random access procedure, random access resource configuration (for SDT configuration), and RA-SDT procedure are described below.

Based on the 3GPP technical specifications, two types of random access procedure are supported, namely, a 4-step RA type (with MSG1) (e.g., CFRA and/or 4-step CBRA) and a 2-step RA type (with MSGA) (e.g., 2-step CFRA and/or 2-step CBRA). Both types of RA procedures support contention-based random access (CBRA) and contention-free random access (CFRA).

The UE selects the type of random access at initiation of the random access procedure based on network configuration:
when CFRA resources are not configured, an RSRP threshold is used by the UE to select between 2-step RA type and 4-step RA type;
when CFRA resources for 4-step RA type are configured, UE performs random access with 4-step RA type;
when CFRA resources for 2-step RA type are configured, UE performs random access with 2-step RA type.

The network does not configure CFRA resources for 4-step and 2-step RA types at the same time for a BWP. CFRA with 2-step RA type is only supported for handover.

The MSGA of the 2-step RA type includes a preamble on a PRACH and a payload on a PUSCH. After MSGA transmission, the UE monitors for a response from the network within a configured window. For CFRA, upon receiving the network response, the UE ends the random access procedure. For CBRA, if contention resolution is successful upon receiving the network response, the UE ends the random access procedure; while if fallback indication is received in MSGB, the UE performs MSG3 transmission and monitors contention resolution. If contention resolution is not successful after MSG3 (re)transmission(s), the UE goes back to MSGA transmission.

If the random access procedure with 2-step RA type is not completed after a number of MSGA transmissions, the UE may be configured to switch to CBRA with 4-step RA type.

For random access in a cell configured with SUL, the network may explicitly signal which carrier to use (UL or SUL). Otherwise, the UE selects the SUL carrier if and only if the measured quality of the DL is lower than a broadcast threshold. UE performs carrier selection before selecting between 2-step and 4-step RA types. The RSRP (e.g., Downlink Reference Signal Received Power, DL-RSRP) threshold for selecting between 2-step and 4-step RA types may be configured separately for UL and SUL. Once started, all UL transmissions of the random access procedure remain on the selected carrier.

When CA is configured, random access procedure with 2-step RA type is only performed on a PCell while contention resolution may be cross-scheduled by the PCell.

When CA is configured, for random access procedure with 4-step RA type, the first three steps of CBRA always occur on a PCell while contention resolution (step 4) may be cross-scheduled by the PCell. The three steps of a CFRA started on the PCell remain on the PCell. CFRA on an SCell may only be initiated by the gNB to establish timing advance for a secondary TAG: the procedure is initiated by the gNB with a PDCCH order (step 0) that is sent on a scheduling cell of an activated SCell of the secondary TAG, preamble transmission (step 1) takes place on the indicated SCell, and Random Access Response (step 2) takes place on the PCell. During an RA-SDT procedure, the UE may transmit pending data in MSG1/MSG3 or the following successive UL packets during a 4-step RA procedure, which may be ended after receiving an RRCRelease message from the serving RAN to finish an active SDT procedure. During an RA-SDT procedure, the UE may transmit pending data in MSGA and the following UL packets during a 2-step RA procedure, which may be ended after receiving an RRCRelease message from the serving RAN to finish an active SDT procedure.

Figure 3A:
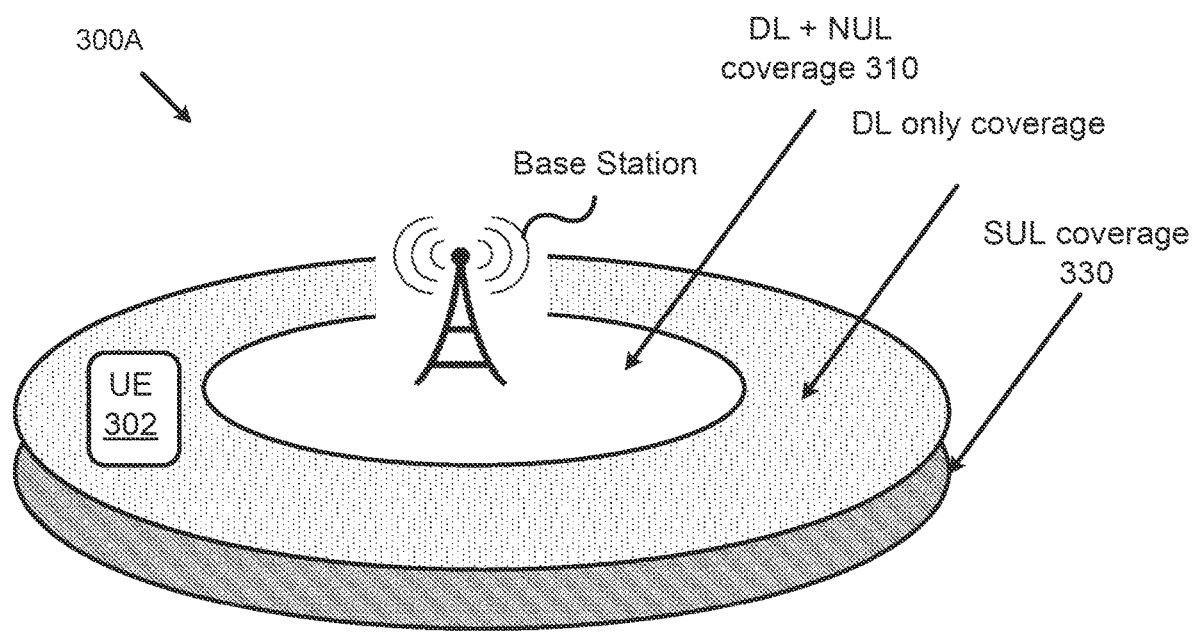
FIG. 3A illustrates a diagram of NUL and SUL carriers having different physical coverage areas, according to an example embodiment of the present disclosure.

To improve UL coverage for high frequency scenarios, a SUL may be configured. With the SUL, a UE 302 is configured with two ULs for each DL of the same cell as depicted in FIG. 3A. FIG. 3A illustrates a diagram of NUL and SUL carriers having different physical coverage areas, according to an example embodiment of the present disclosure. As shown in diagram 300A of FIG. 3A, NUL and SUL carriers may provide different physical coverage areas, such as DL and NUL coverage area 310 and SUL coverage area 330.

Figure 3B:
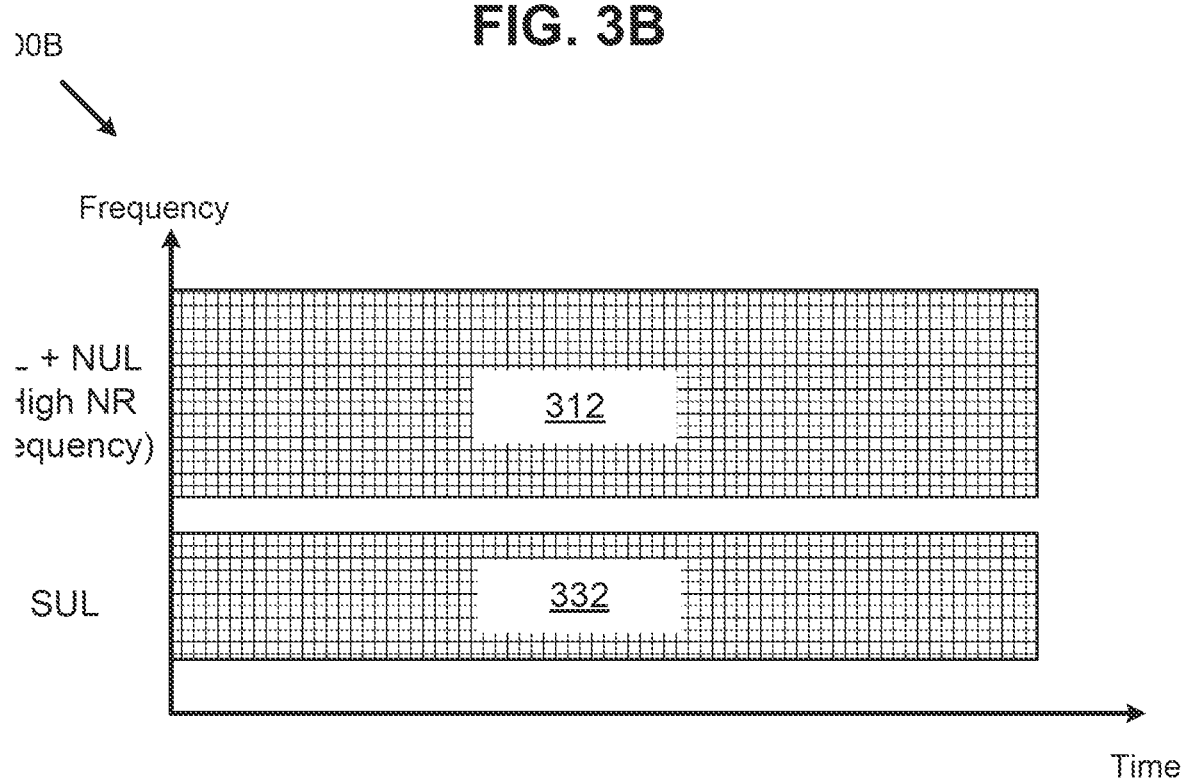
FIG. 3B illustrates a diagram of NUL and SUL carriers having different frequency ranges, according to an example embodiment of the present disclosure.

FIG. 3B illustrates a diagram of frequency ranges of a NUL carrier and a SUL carrier, according to an example embodiment of the present disclosure. As shown in diagram 300B of FIG. 3B, NUL and SUL carriers are located on different frequency ranges. For example, the NUL carrier is located on frequency range 312, and the SUL carrier is located on frequency range 332.

(E-UTRA/NR) V2X Services, (E-UTRA/NR) SL service and PC5 interface are described below.

Vehicle-to-Everything (V2X) service or SL service is provided to support the information exchange between vehicles. In LTE protocols, V2X service could be supported in the air interface by an Uu interface and a PC5 interface. The PC5 interface covers designs in Layer 2 and Layer 1. The air link interface on a PC5 interface is also called SL in LTE protocols. LTE network supports SL operations since Release 12.

Figure 4:
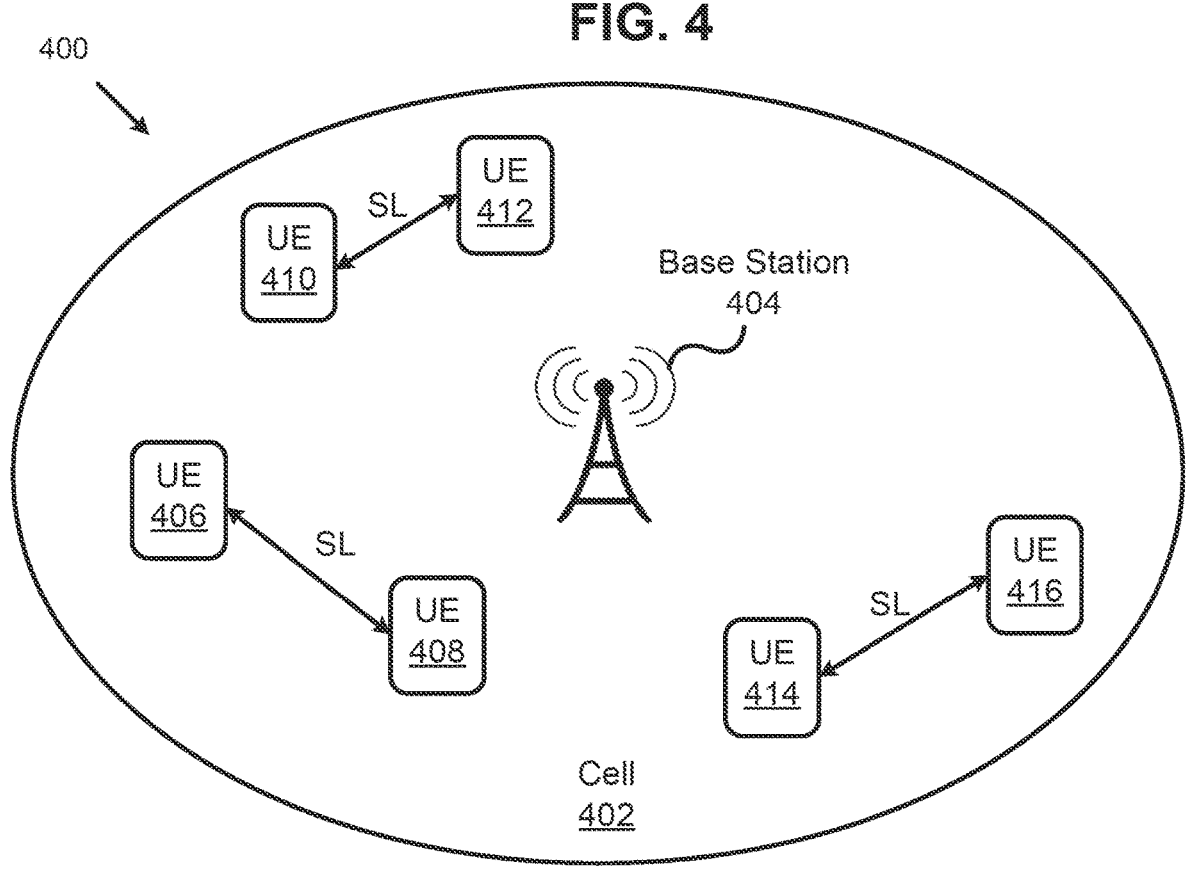
FIG. 4 illustrates a diagram of UEs exchanging information directly through SL operations within a cell without relaying through a base station, according to an example embodiment of the present disclosure.

FIG. 4 illustrates a diagram of UEs exchanging information directly through SL operations within a cell without relaying the SL signals, for example, through a base station, according to an example embodiment of the present disclosure. As shown in diagram 400 of FIG. 4, with SL (SL) operations, UEs (e.g., UE 406, 408, 410, 412, 414, and 416) in cell 402 may exchange data and control signaling directly without the relaying of the base station 404 (e.g., an eNB in an LTE network or a gNB in an NR network). For the convenience of description, all of the UEs in the present disclosure are capable and authorized to access V2X service using the PC5 interface with neighboring UEs and RAN.

The V2X service/SL service may be further categorized based on different cast-types, such as unicast, multi-cast, and broadcast. For unicast, there are only two UEs in one SL group and the formulation of the SL group may be achieved in the Non-Access-Stratum (NAS layer). For multi-cast (or groupcast), there are more than two UEs that are grouped in one SL group to exchange SL packets with all other members in the SL group. In implementations, SL groups may be formulated in the application layer (e.g., V2X application layer), NAS layer (e.g., PC5-S protocols) or AS layer (e.g., SL Radio Resource Control Layer signaling, PC5-RRC signaling). For SL broadcast, there is no limitation to the SL group. A UE is able to broadcast message(s) and its neighbor UE(s) under the SL communication range could receive and decode the broadcasting message(s) successfully. In some implementations, the SL communication range may differ with transmission power, hardware sensitivity, and etc.

To enable an SL operation under the coverage of Radio Access Networks (e.g., E-UTRAN or NR-RAN), cells (e.g., LTE or NR cells) may provide SL configurations and SL resource allocations to the UEs. To the UEs that are under the coverage of cellular networks, the UEs need to perform SL operations based on the configurations of the RANs. To enable SL operation under the coverage of a RAN, the serving cell (or camped cells) needs to provide SL configurations and SL resource allocations to the UEs.

In LTE V2X service, two basic approaches are provided for SL resource allocation, namely scheduled resource allocation and UE autonomous resource selection from SL resource pools.

First, a scheduled resource allocation may be characterized as follow: The UE needs to be (LTE/NR) RRC_Connected state in order to transmit data. The UE requests SL resources from the eNB (by sending SL buffer status report (SL-BSR) to the serving cell). The eNB schedules dedicated SL resource for the UE to transmit SL control information and SL data. To achieve this, the eNB would request UE to report SL buffer status report through Uu interface. In addition, the UE may also trigger a Scheduling Request (SR) on UL physical resource (e.g., a PUCCH) or initiate random access procedure while the UE wants to transmit SL-BSR to the eNB but valid UL resource is absent. It's noted that the SR resource (or configurations) and the SR procedure are common for both SL operations and UL traffic.

Second, a UE's autonomous resource selection from SL resource pools may be characterized as follows. UE autonomous resource selection may be applied to both RRC Connected UE (e.g., through dedicated RRC signaling or through system information broadcasting) and RRC inactive/idle state (e.g., through system information broadcasting). Resource pool is a set of (virtually continuous) resource blocks and so UE could decide which physical resource blocks that the UE wants to apply for SL packet transmission autonomously. The UE may on its own select resources from resource pools and perform transport format selection to transmit SL control information and data. The UE may perform sensing for (re)selection of SL resources before SL packet delivery. Based on sensing results, the UE (re)selects some specific SL resources and reserves multiple SL resources. Up to 2 parallel (independent) resource reservation processes are allowed to be performed by the UE. The UE is also allowed to perform a single resource selection for its V2X SL transmission.

It should be noted that, when the UE is out of coverage on the frequency used for V2X SL communication and if the eNB does not provide a V2X SL configuration for that frequency, the UE may use a set of transmission and reception resource pools pre-configured in the UE. V2X SL communication resources may not be shared with other non-V2X data transmitted over SL. In some implementations, a UE may obtain the pre-configuration through the installed USIM (UMTS Subscriber Identity Module), stored memory, or through RAN which the UE has been accessed earlier. Moreover, the UE may implement a PC5 interface by synchronizing with GNSS (Global Navigation Satellite System) and applying pre-configuration. Under this condition, the PC5 interface may be independent of the RAN and (LTE/NR) Uu interface.

Figure 5A:
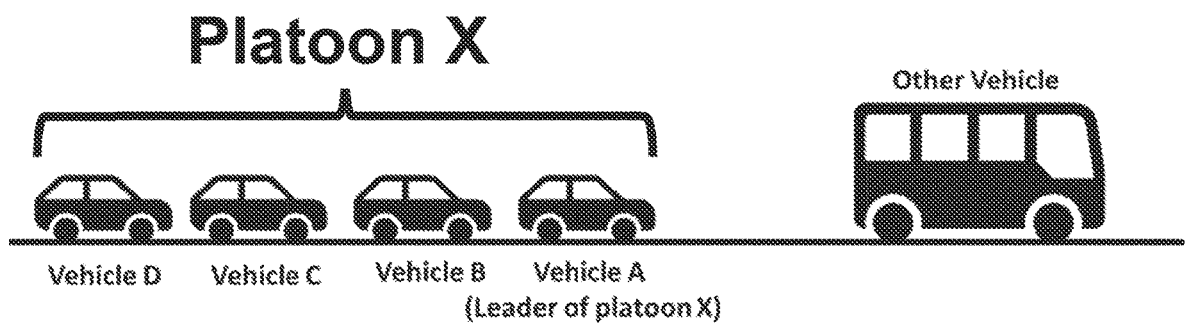
FIG. 5A illustrates a diagram of an example V2X platoon scenario in which one vehicle plays the role of a leader and/or scheduler in the platoon, according to an example embodiment of the present disclosure.

FIG. 5A illustrates a diagram of an example V2X platoon scenario in which a vehicle plays the role of a leader and/or scheduler in the platoon, according to an example embodiment of the present disclosure. As shown in diagram 500A of FIG. 5A, the Platoon X is composed of Vehicle A, Vehicle B, Vehicle C, and Vehicle D. There is at least one scheduler (e.g., Vehicle A) in the platoon. In Platoon X, Vehicle A may configure the SL resources to the members in the same platoon through the following approaches.

In Mode 1 approach, the scheduler may configure dynamic SL grants to the members in the same platoon (e.g., dynamic SL grant through SL Control Information). In addition, the scheduler may also configure semi-periodic SL grant (e.g., configured SL grant) to the UE through SL control signaling (e.g., through Physical SL Broadcast Channel, or SL Radio Resource Control (RRC) signaling). To achieve Mode 1-like approach, the scheduler may need the UEs to provide feedback information through a PC5 interface.

In Mode 2 approach, the scheduler may configure the SL resource pools to the members in the same platoon. The UEs may select the SL grant by the UEs themselves automatically (e.g., SL grant selection with or without sensing). The platoon scenario may be applied when the vehicles of the platoon are in-coverage (e.g., all of the vehicles in the platoon are under the coverage of cellular radio access network), out-of-coverage (e.g., all of the vehicles in the platoon are out of the coverage of cellular radio access network), or partially in-coverage (e.g., some of the UEs in the platoon are in-coverage and the other UEs in the platoon is out-of-coverage).

In the present implementation, to support Vehicle A (e.g., the scheduler), the members in the Platoon X may need to support the following progress to report their own statuses to the scheduler through a PC5 interface and/or a Uu interface:
  a. SL Scheduling Request (SL-SR) configuration & report,
  b. SL buffer status report (SL-BSR) configuration & report, and
  c. SL power headroom report (SL-PHR) configuration & report.

Figure 5B:
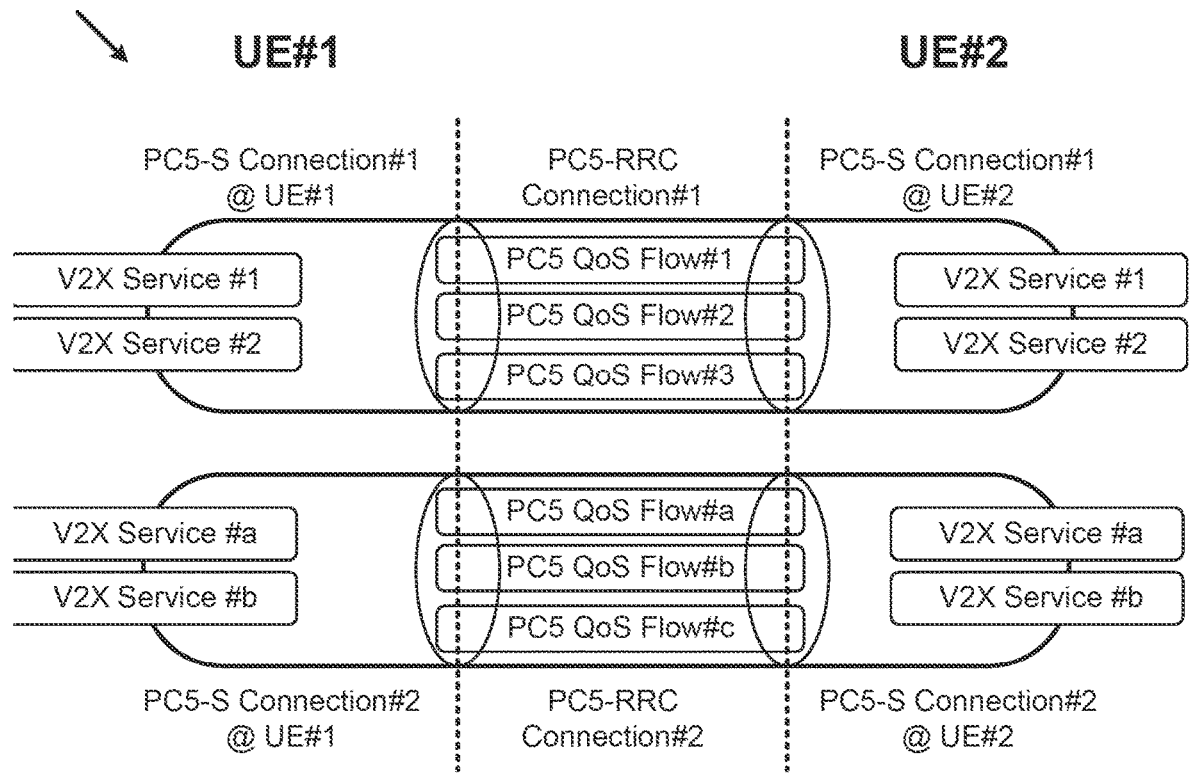
FIG. 5B illustrates a diagram of a pair of UEs having multiple PC5-RRC connections, according to an example embodiment of the present disclosure.

FIG. 5B illustrates a diagram of a pair of UEs having multiple PC5-RRC connections, each of which may support a different set of V2X service(s) and have different QoS requirements, according to an example embodiment of the present disclosure.

In diagram 500B of FIG. 5B, a pair of UEs may construct multiple PC5-RRC connections, where each PC5-RRC connection may support a different set of V2X service(s) with different QoS requirements respectively.

In the present implementation, a PC5-RRC connection may be different from an RRC connection in a Uu interface. In an NR PC5 interface, an SL-unicast group (e.g., UE #1 and UE #2 in FIG. 5B) may firstly need to build at least one PC5-S connection and each PC5-S connection may be associated with a PC5-RRC connection in the Access Stratum layer (AS layer) independently. In other words, the PC5-S connection and PC5-RRC connection may have a one-to-one mapping relationship. Each PC5-RRC connection may be a logical connection between a pair of source and destination (Layer-2) IDs. In the service level, a PC5-S connection (and the associated PC5-RRC connection) may be built to serve one or more V2X services. For example, the PC5-S connection #1s at the UE #1 and UE #2 are constructed to serve V2X service #1/#2 and the PC5-S connection #2s are constructed to serve V2X service #a/#b. It is also noted that there may be multiple active PC5-S connections/PC5-RRC connections in the paired UEs to support different sets of V2X services which may have different QoS requirements. Also, in some implementations, the UEs may also report the status of PC5-RRC connections to the serving cell (e.g., a PCell in master cell group or a PSCell in secondary cell group) and so the serving RAN may also know the conditions of PC5-RRC connections in the UE side. In addition, the UE may also report the SL radio link failure event (to at least one PC5-RRC connection) to the serving RAN (e.g., for the reason of SL resource management such as Mode 1 SL resource configuration approach). In addition, a UE may also join multiple SL-unicast groups with different target UEs. Thus, a UE may have PC5-RRC connections that are associated with different UEs.

In some implementations, the NR SL service may cover NR SL communication services and/or NR SL discovery services. In some implementations, the E-UTRA V2X service may cover E-UTRA V2X SL communication services and/or E-UTRA V2X SL discovery services.

The timing of SL and UL transmissions are discussed below.

Figure 6:
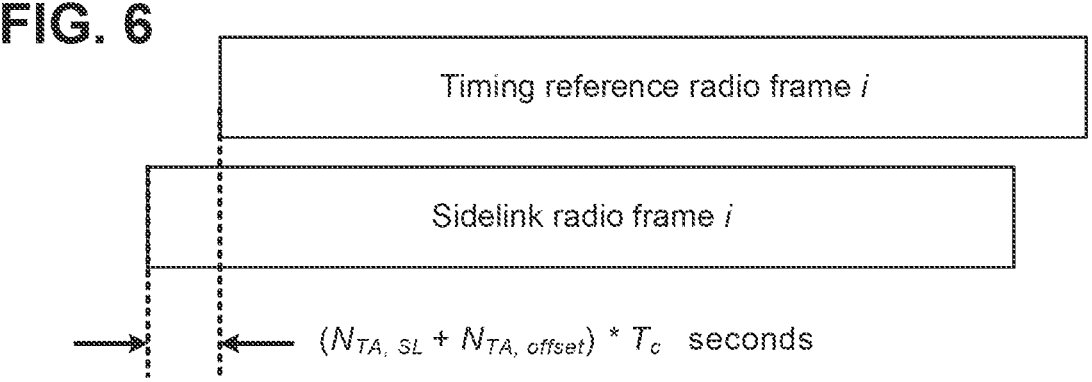
FIG. 6 illustrates a diagram of an SL timing relationship, according to an example embodiment of the present disclosure.

First, NR SL timing is discussed. FIG. 6 illustrates a diagram of an SL timing relationship, in accordance with Citation 7, according to an example embodiment of the present disclosure. As illustrated in FIG. 6, the transmission of an SL radio frame number from the UE shall start $(N_{TA, SL}+N_{TA, offset}) \cdot T_C$ seconds, before the start of the corresponding timing reference frame at the UE. According to Citation 6, transmission of a SL radio frame number i from the UE shall start $(N_{TA, SL}+N_{TA\ offset}) \cdot T_C$ seconds before the start of the corresponding timing reference frame at the UE. The UE is not required to receive SL or DL transmissions earlier than $N_{TA,offset}$, which may be given in Citation 7, after the end of an SL transmission.

For SL transmissions:
  if the UE has a serving cell fulfilling the S criterion according to clause 8.2 of Citation 8
    The timing of reference radio frame equals that of downlink radio frame in the cell with the same uplink carrier frequency as the SL and
    $N_{TA,\ offset}$ is given by the Uplink-Downlink timing relationship section below, Otherwise
The timing of reference radio frame i is implicitly obtained from clause 4.2 of Citation 1 and
$N_{TA, offset}=0$.
The quantity $N_{TA, SL}$ equals to 0.

Figure 7:
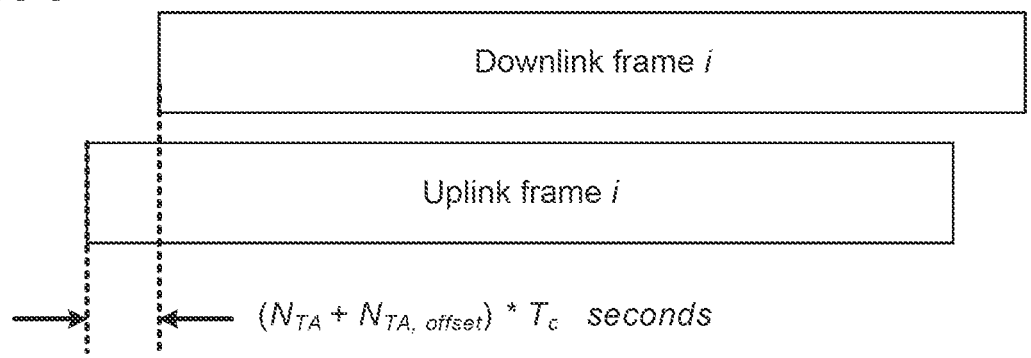
FIG. 7 illustrates a diagram of a DL-UL timing relationship, according to an example embodiment of the present disclosure.

Second, the UL-DL timing relationship is described below. FIG. 7 illustrates a diagram of a DL-UL timing relationship, in accordance with Citation 6, according to an example embodiment of the present disclosure. As illustrated in FIG. 7, in a cellular network, due to the propagation between DL and UL direction, a UE needs to adjust its UL timing advance (TA) values in different situations. As illustrated in FIG. 7, $$\text{Timing Advance}=(N_{TA}+N_{TA,offset})*T_C \quad \text{(Equation 1)}$$

Here, $T_C$ may be a fixed value pre-defined in 3GPP technical specification (e.g., 0.509 ns).

$N_{TA, offset}$ is a fixed value which may be configured by the serving cell through broadcasting (e.g., SIB1 in system information) or dedicated control signaling (e.g., RRC signaling, such as RRC(Connection)Reconfiguration message).

In addition, the value of $N_{TA}$ may be decided based on different conditions:

Condition (A)—when the UE Initiates a Random Access Procedure by Preparing to Send a Preamble.

Based on Citation 9, the UE would set the value of $N_{TA}$ to zero (i.e., $N_{TA}=0$), while the UE is preparing to send the preamble during the random access procedure. That is, the value of $N_{TA}$ is set to zero for preamble transmission.

In addition, it is noted that the condition (A) may happen in Contention-based random access (CBRA) procedure and Contention-free random access (CFRA) procedure. This condition may also happen in the 4-step random access procedure and 2-step random access procedure.

Condition (B)—when the UE Decodes Random Access Response (RAR) from the Serving Cell Successfully.

During the contention-based random access procedure, the UE may obtain timing advance command from the serving cell by receiving the Random Access Response (RAR) message. In this condition, the amount of the time alignment for the carrier of Subcarrier Carrier Spacing (SCS) of Hz is and so it is relative to the SCS of the first UL transmission from the UE after the reception of the random access response. In the RAR message, the serving cell may configure a TA value through the range of index values {0, 1, 2, . . . 3846} and the serving cell transmits an index value in the RAR message to the UE.

Condition (C)—when the UE is in the RRC Connected State.

In condition (C), the serving cell could deliver a dedicated control signaling (e.g., Medium Access Control (MAC) Control Element (CE)) in the Physical Downlink Shared Channel to indicate the UE to adjust its TA value. Moreover, Condition C) may be realized through a closed-loop approach and so a new $N_{TA}$ value ($N_{TA\_new}$) may be configured based on current $N_{TA}$ value ($N_{TA\_old}$).

For example, $$N_{TA\_new}=N_{TA\_old}+(T_A-31)\cdot 16\cdot 64/2^\mu \quad \text{(Equation 2)}$$

In the MAC CE, the serving cell may configure a TA value through the range of index values {0, 1, 2, . . . 63}.

E-UTRA SL timing relationship is descried below.

Figure 8:
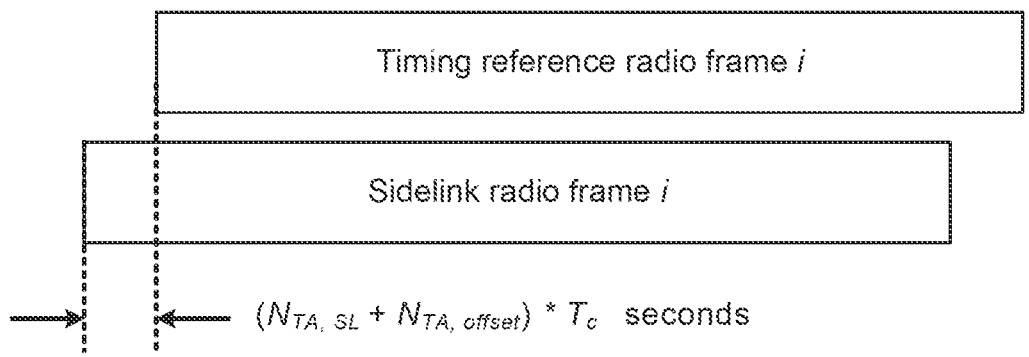
FIG. 8 illustrates a diagram of a E-UTRA SL timing relationship, according to an example embodiment of the present disclosure.

FIG. 8 illustrates a diagram of a E-UTRA SL timing relationship, in accordance with Citation 12, according to an example embodiment of the present disclosure. As illustrated in FIG. 8, the transmission of an SL radio frame number i from the UE shall start $(N_{TA, SL}+N_{TA} \text{ offset})\cdot T_s$ seconds before the start of the corresponding timing reference frame at the UE. The UE is not required to receive SL or downlink transmissions earlier than $624T_s$ after the end of an SL transmission.

For PSDCH transmission and SL synchronization signal transmission for PSDCH:
if the UE has a serving cell fulfilling the S criterion according to clause 5.2.3.2 of Citation 10
the timing of reference radio frame i equals that of downlink radio frame i of the cell c as given in Subclause 14.3.1 of Citation 11 and
$N_{TA \text{ offset}}$ is given by clause 8.1 of Citation 6,
otherwise
the timing of reference radio frame i is implicitly obtained from Citation 11
and
$N_{TA \text{ offset}}=0$.

For all other SL transmissions:
if the UE has a serving cell fulfilling the S criterion according to Citation 10
the timing of reference radio frame i equals that of downlink radio frame i in the cell with the same uplink carrier frequency as the SL and
$N_{TA \text{ offset}}$ is given by clause 8.1 of Citation 12,
otherwise
the timing of reference radio frame i is implicitly obtained from Citation 11 and
$N_{TA \text{ offset}}=0$.

In the present disclosure, solutions are provided to address various pending issues where (NR/E-UTRA) SL operation (e.g., for NR SL communication service or for E-UTRA SL communication service) is jointly considered with small data transmission. The solutions include mechanisms that may be applied to the Radio Access Network (e.g., NR-RAN or E-UTRAN) side as well as the UE (e.g., NR UE or E-UTRA UE) side. The various solutions are not limited to SL operation and small data transmission.

In the present disclosure, the SL packet transmission/reception may include, but are not limited to, E-UTRA Vehicle-to-Everything (V2X) SL communication services, New Radio SL communication services, E-UTRA SL communication/discovery services. In addition, the SL packet transmission/reception may be implemented on one or more NR PC5 interfaces and/or E-UTRA PC5 interfaces. The SDT procedure may be implemented on one or more NR Uu interfaces and/or E-UTRA Uu interfaces. In addition, the solutions may not be limited by SDT procedure. For example, the disclosed solutions may also be applicable to a UE that is in other RRC states (e.g., an RRC_Connected state or an RRC_Idle state).

FIG. 9 illustrates a flowchart of a method performed by a UE, according to an implementation of the present disclosure. As shown in the flowchart 900, in action 902, a UE may initiate an SDT procedure for transmitting a first set of data packets to a BS via a UL transmission. In one example, the UL transmission may be implemented on an E-UTRA or NR Uu interface. In action 904, the UE may initiate an SL transmission for transmitting a second set of data packets to another UE. In one example, the SL transmission may be implemented on an E-UTRA or NR PC5 interface. In action 906, the UE may determine that the UE is not able to perform the UL transmission simultaneously with the SL transmission. In action 908, the UE may determine whether to prioritize the UL transmission over the SL transmission while the UE is out of RRC_Connected state (e.g., E-UTRA/NR RRC_Inactive or E-UTRA/NR RRC_Idle), when there is a conflict between the UL transmission and the SL transmission. For example, a conflict between the UL transmission and the SL transmission may exist when the UL transmission at least partially overlaps with the SL transmission in at least physical resource, such as in the time domain and/or the frequency domain.

FIG. 10 illustrates a flowchart of a method performed by a UE, according to an implementation of the present disclosure. In one implementation, the flowchart 1000 may be a part of action 908 in the flowchart 900 in FIG. 9. In the flowchart 1000, in action 1002, a UE may determine that the SDT procedure is a CG-SDT procedure. In action 1004, the UE may determine that the UL transmission is transmitted on a configured grant UL or a dynamic grant UL provided by the BS.

FIG. 11 illustrates a flowchart of a method performed by a UE, according to an implementation of the present disclosure. In one implementation, the flowchart 1100 may be a part of action 908 in the flowchart 900 in FIG. 9. In the flowchart 1100, in action 1102, a UE may determine that the SDT procedure is an RA-SDT procedure. In action 1104, the UE may determine that the UL transmission is transmitted on a 2-step Random Access procedure, a 4-step Random Access procedure, or a dynamic grant UL provided by the BS during the RA-SDT procedure.

FIG. 12 illustrates a flowchart of a method performed by a UE, according to an implementation of the present disclosure. In one implementation, the flowchart 1200 may be a part of action 908 in the flowchart 900 in FIG. 9. In the flowchart 1200, in action 1202, a UE may determine that the UL transmission comprises a CG UL transmission (e.g., associated with the CG-SDT procedure). In action 1204, the UE may determine to prioritize the UL transmission over the SL transmission. In some additional implementations, the UL packet transmissions in the CG-SDT procedure (which includes UL packets transmitted via UL configured grants and/or dynamic grants) may always be prioritized by the UE over SL transmissions. In some other implementations, the UL packet transmissions in the RA-SDT procedure may always be prioritized by the UE over SL transmissions.

FIG. 13 illustrates a flowchart of a method performed by a UE, according to an implementation of the present disclosure. In one implementation, the flowchart 1300 may be a part of action 908 in the flowchart 900 in FIG. 9. In the flowchart 1300, in action 1302, a UE may receive at least one of one or more SL transmission priority thresholds and/or one or more UL transmission priority thresholds from at least one of the BS and another BS. In an example, the UE may receive the threshold value(s) via SI. In another example, the UE may receive the threshold value(s) via UE-specific control signaling. In action 1304, the UE may compare the received one or more SL transmission priority thresholds and a priority value associated with the SL transmission. In some implementations, one parameter SL-prioritizationThreshold may be configured to the UE as one of the ProSe Per-Packet Priority Value (e.g., PPPP=integer{1~8}, which PPPP=1 represents the highest priority and PPPP=8 represents the lowest priority). Then, the UE may derive the priority value of the pending SL transmission based on the value of the highest priority of SL logical channel(s) (e.g., the SL logical channels which have associated SL data being assembled and encoded in the SL transmission) and/or a MAC CE which are assembled and encoded in the SL transmissions (e.g., an SL MAC PDU of the pending SL transmission). The UE may consider that the SL transmission has a higher priority over UL transmission if the derived priority value of the (SL) MAC PDU is lower than the given SL-prioritizationThreshold. In contrast, the UE may consider that the SL transmission has a lower priority in comparison with the pending UL transmission if the derived priority value of the (SL) MAC PDU is higher than (or equivalent to) the given SL-prioritizationThreshold. In some implementations, the PPPP values of each SL logical channel may be configured by serving cell via broadcasting system information or UE-specific RRC signaling. In some other implementations, the PPPP values of each SL logical channel may be configured paired UE via a PC5 RRC signaling. In some additional implementations, the PPPP values of each SL logical channel may be configured via SL pre-configuration, which may be pre-installed in the UE side. In some implementations, the priority value of one specific SL MAC PDU may be pre-defined in the technical specification (e.g., in Citation 2).

In action 1306, the UE may determine whether to prioritize the UL transmission over the SL transmission based on the comparison. In some implementations, the UE may decide to transmit the UL transmission first if the UE prioritizes the UL transmission over the SL transmission (and so for pending SL transmission(s), which is considered to have a low priority after action 1306, may be pended/suspended/buffered by the UE (e.g., the MAC entity of the UE may pend/suspend/buffer the SL transmission and the SL transmission may be transmitted by the MAC entity after the (high priority) UL transmission is finished successfully). In some other implementations, the UE may decide to transmit the SL transmission first if the UE prioritizes the SL transmission over the UL transmission (and so for pending UL transmission(s), which is considered to have a low priority after action 1306, would be pended/suspended/buffered by the UE (e.g., the MAC entity of the UE may pend/suspend/buffer the UL transmission(s) and the UL transmission(s) may be transmitted by the MAC entity after the (high priority) SL transmission is finished successfully).

It is noted that, in action 1306, the UE may decide to ignore one or more SL priority thresholds received in action 1302. In some implementations, the UE may decide to ignore one or more SL priority thresholds and (always) prioritize UL transmissions for SDT procedure over pending SL transmission(s). In some other implementations, the UE may decide to ignore one or more SL priority thresholds and (always) prioritize SL transmissions over pending UL transmission(s).

In action 1308, the UE may compare the received one or more UL transmission priority thresholds and a priority value associated with the UL transmission. In some implementations, one parameter UL-prioritizationThreshold may be configured to the UE as one of the Uplink Priority Value (e.g., Uplink Priority Value=integer{1~16}, which Uplink Priority Value=1 represents the highest priority and Uplink Priority Value=16 represents the lowest priority). Then, the UE may derive the priority value of one pending UL transmission based on the value of the highest priority of UL logical channel(s) (e.g., the UL logical channels which have associated UL data being assembled and encoded in the pending UL transmission(s)) and/or a MAC CE which are assembled and encoded in the UL transmissions (e.g., a UL MAC PDU of the pending UL transmission). The UE may consider that the UL transmission has a higher priority over an SL transmission if the derived highest Uplink Priority Value of the pending UL transmission(s) is lower than the given UL-prioritizationThreshold. In contrast, the UE may consider that the UL transmission(s) has a lower priority in comparison with the pending SL transmission(s) if the derived priority value of the pending UL transmission(s) is higher than (or equal to) the given UL-prioritizationThreshold. In some implementations, the Uplink Priority Values of each UL logical channel may be configured by serving cell via broadcasting system information or UE-specific RRC signaling. In some implementations, the Uplink Priority Value of one specific UL MAC PDU may be pre-defined in the technical specification (e.g., in Citation 2).

In action 1310, the UE may determine whether to prioritize the UL transmission over the SL transmission based on the comparison. The UE may decide to transmit the UL transmission first if the UE prioritizes the UL transmission over the SL transmission (and so for pending SL transmission(s), which is considered to have a low priority after action 1308, may be pended/suspended/buffered by the UE (e.g., the MAC entity of the UE may pend/suspend/buffer the SL transmission and the SL transmission may be transmitted by the MAC entity after the (high priority) UL transmission is finished successfully). In some other implementations, the UE may decide to transmit the SL transmission first if the UE prioritizes the SL transmission over the UL transmission (and so for pending UL transmission(s), which is considered low priority after action 1308, may be pended/suspended/buffered by the UE (e.g., the MAC entity of the UE may pend/suspend/buffer the UL transmission(s) and the UL transmission(s) may be transmitted by the MAC entity after the (high priority) SL transmission is finished successfully).

It is noted that, in action 1310, the UE may decide to ignore the one or more UL priority thresholds received in action 1302. In some implementations, the UE may decide to ignore the one or more UL priority thresholds and (always) prioritize UL transmissions for SDT procedure over pending SL transmission(s). In some other implementations, the UE may decide to ignore the one or more UL priority thresholds and (always) prioritize SL transmissions over pending UL transmission(s).

In some implementations, the value of proposed SL-prioritizationThreshold may be configured (e.g., being configured by the UE's serving RAN, by paired UE via PC5 interface, or being pre-defined in technical specification) to reuse another SL priority threshold: sl-PriorityThreshold, which is already defined in 3GPP spec (in Citation 14) to address the UL/SL transmission conflict for non-SDT conditions (e.g., for UL/SL transmissions while the UE is staying in RRC Connected state). In some implementations, the UE may be configured to apply the same parameter (e.g., one sl-PriorityThreshold value) and the same UL/SL transmission conflict resolution mechanism (e.g., as described in Citation 14) to resolve the UL-SL transmission conflict during SDT procedures and non-SDT conditions (e.g., UL/SL transmissions while the UE is staying in RRC Connected state and UL/SL transmissions during a RRC procedure while the UE is staying in idle mode).

In some implementations, the value of proposed UL-prioritizationThreshold may be configured (e.g., being configured by the UE's serving RAN, by a paired UE via a PC5 interface, or being pre-defined in the technical specifications) to reuse another UL priority threshold: ul-PriorityThreshold, which is defined in Citation 14 to address the UL/SL transmission conflict for non-SDT conditions (e.g., for UL/SL transmissions while the UE is staying in the RRC Connected state). In some implementations, the UE may be configured to apply the same parameter (e.g., one ul-PriorityThreshold value) and the same UL/SL transmission conflict resolution mechanism (e.g., as shown in Citation 14) to resolve the UL-SL transmission conflict during SDT procedures and non-SDT conditions (e.g., UL/SL transmissions while the UE is staying in RRC Connected state and UL/SL transmissions during an RRC procedure while the UE is staying in idle mode).

Figure 14:
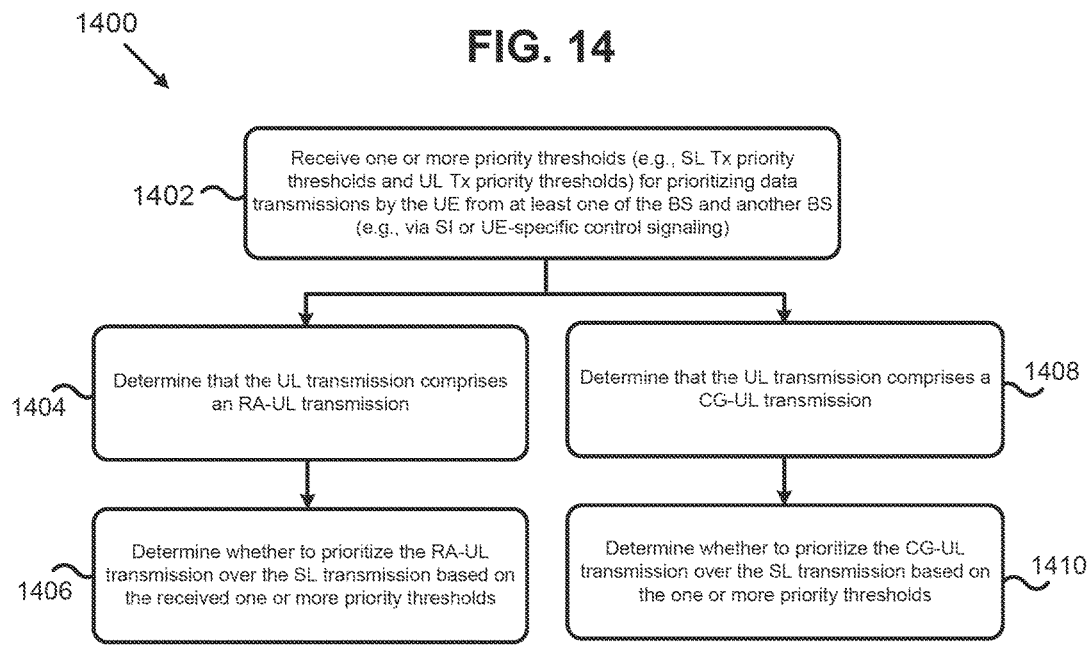
FIG. 14 illustrates a flowchart illustrating a method/process performed by a UE for determining whether to prioritize a UL transmission over an SL transmission while the UE is out of RRC_Connected state, according to an example implementation of the present disclosure.

In some additional implementations, UE may be able (or be allowed) to decide (e.g., it is UE implementation) how to resolve the UL-SL transmission conflict (e.g., whether to reuse the same UL/SL transmission conflict resolution mechanisms (as described in Citation 14) or whether to (always) prioritize UL or SL transmission while a UL/SL conflict arises) by the UE itself. FIG. 14 illustrates a flowchart of a method performed by a UE, according to an implementation of the present disclosure. In one implementation, the flowchart 1400 may be a part of action 908 in the flowchart 900 in FIG. 9. In action 1402, a UE may receive one or more priority thresholds (e.g., SL Tx priority thresholds and UL Tx priority thresholds) for prioritizing data transmissions by the UE from at least one of the BS and another BS. The one or more priority thresholds may include one or more SL Tx priority thresholds. The one or more priority thresholds may include UL Tx priority thresholds. In an example, the UE may receive the threshold value(s) via SI. In another example, the UE may receive the threshold value(s) via UE-specific control signaling. In action 1404, the UE may determine that the UL transmission comprises an RA-UL transmission. In action 1406, the UE may determine whether to prioritize the RA-UL transmission over the SL transmission based on the received one or more priority thresholds. In some implementations, one parameter RA-UL-prioritizationThreshold may be configured to the UE as one of the RA-UL Priority Value (e.g., Uplink Priority Value=integer{1~16}, which RA-UL Priority Value=1 represents the highest priority and Uplink Priority Value=16 represents the lowest priority). Then, the UE may derive the priority value of one pending RA-UL transmission based on the value of the highest priority of UL logical channel(s) (e.g., the UL logical channels which have associated UL data being assembled and encoded in the pending UL transmission(s)) and/or a MAC CE which are assembled and encoded in the UL transmissions (e.g., a UL MAC PDU of the pending RA-UL transmission). The UE may consider that the RA-UL transmission has a higher priority over the SL transmission if the derived highest RA-UL Priority Value of the pending UL transmission(s) is lower than the given RA-UL-prioritizationThreshold. In contrast, the UE may consider that the RA-UL transmission(s) has a lower priority in comparison with the pending SL transmission(s) if the derived priority value of the pending RA-UL transmission(s) is higher than (or equivalent to) the given RA-UL-prioritizationThreshold. In some implementations, the RA-UL Priority Values of each UL logical channel may be configured by serving cell via broadcasting system information or UE-specific RRC signaling. In some implementations, the RA-UL Priority Value of one specific UL MAC PDU may be pre-defined in the technical specification (e.g., in Citation 2). In some other implementations, one parameter SL-RAUL-prioritizationThreshold may be configured to the UE as one of the ProSe Per-Packet Priority Value (e.g., PPPP=integer{1~8}, which PPPP=1 represents the highest priority and PPPP=8 represents the lowest priority). Then, the UE may derive the priority value of the pending SL transmission based on the value of the highest priority of SL logical channel(s) (e.g., the SL logical channels which have associated SL data being assembled and encoded in the SL transmission) and/or a MAC CE which are assembled and encoded in the SL transmissions (e.g., an SL MAC PDU of the pending SL transmission). The UE may consider that the SL transmission has a higher priority over RA-UL transmission if the derived priority value of the (SL) MAC PDU is lower than the given SL-RAUL-prioritizationThreshold. In contrast, the UE may consider that the SL transmission has a lower priority in comparison with the pending RA-UL transmission if the derived priority value of the (SL) MAC PDU is higher than (or equal to) the given SL-RAUL-prioritizationThreshold. Then, based on the comparison result, the UE may treat or handle the high priority (SL/UL) transmissions first and the low priority transmissions may be pended/suspended/buffered by the UE (e.g., the MAC entity of the UE). The UE may treat or handle the low priority transmissions after the high priority transmissions is finished.

It is noted that, in action 1406, the UE may decide to ignore the one or more SL/UL priority thresholds received in action 1402 and (always) prioritize RA-UL transmissions for RA-SDT procedure over pending SL transmission(s). In some other implementations, the UE may decide to ignore the one or more UL/SL priority thresholds and (always) prioritize SL transmissions over pending RA-UL transmission(s).

In action 1408, the UE may determine that the UL transmission comprises a CG-UL transmission. In action 1410, the UE may determine whether to prioritize the CG-UL transmission over the SL transmission based on the one or more priority thresholds. In some implementations, one parameter CG-UL-prioritizationThreshold may be configured to the UE as one of the CG-UL Priority Value (e.g., Uplink Priority Value=integer{1~16}, which CG-UL Priority Value=1 represents the highest priority and Uplink Priority Value=16 represents the lowest priority). Then, the UE may derive the priority value of one pending CG-UL transmission based on the value of the highest priority of UL logical channel(s) (e.g., the UL logical channels which have associated UL data being assembled and encoded in the pending UL transmission(s)) and/or a MAC CE which are assembled and encoded in the UL transmissions (e.g., a UL MAC PDU of the pending CG-UL transmission). The UE may consider that the CG-UL transmission has a higher priority over the SL transmission if the derived highest CG-UL Priority Value of the pending UL transmission(s) is lower than the given CG-UL-prioritizationThreshold. In contrast, the UE may consider that the CG-UL transmission(s) has a lower priority in comparison with the pending SL transmission(s) if the derived priority value of the pending CG-UL transmission(s) is higher than (or equivalent to) the given CG-UL-prioritizationThreshold. In some implementations, the CG-UL Priority Values of each UL logical channel may be configured by the serving cell via broadcasting system information or UE-specific RRC signaling. In some implementations, the CG-UL Priority Value of one specific UL MAC PDU may be pre-defined in the technical specification (e.g., in Citation 2). In some other implementations, one parameter SL-CGUL-prioritization-Threshold may be configured to the UE as one of the ProSe Per-Packet Priority Value (e.g., PPPP=integer{1~8}, which PPPP=1 represents the highest priority and PPPP=8 represents the lowest priority). Then, the UE may derive the priority value of the pending SL transmission based on the value of the highest priority of SL logical channel(s) (e.g., the SL logical channels which have associated SL data being assembled and encoded in the SL transmission) and/or a MAC CE which are assembled and encoded in the SL transmissions (e.g., an SL MAC PDU of the pending SL transmission). The UE may consider that the SL transmission has a higher priority over the CG-UL transmission if the derived priority value of the (SL) MAC PDU is lower than the given SL-CGUL-prioritizationThreshold. In contrast, the UE may consider that the SL transmission has a lower priority in comparison with the pending CG-UL transmission if the derived priority value of the (SL) MAC PDU is higher than (or equal to) the given SL-CGUL-prioritization-Threshold. Then, based on the comparison result, the UE may treat the high priority (SL/UL) transmissions first and the low priority transmissions may be pended/suspended/buffered by the UE (e.g., the MAC entity of the UE). The UE may treat or handle the low priority transmissions after the high priority transmissions is finished.

It is noted that, in action 1406, the UE may decide to ignore one or more SL/UL priority thresholds received in action 1402 and (always) prioritize CG-UL transmissions for RA-SDT procedure over pending SL transmission(s). In some other implementations, the UE may decide to ignore one or more UL/SL priority thresholds and (always) prioritize SL transmissions over pending CG-UL transmission(s).

It is also noted that, during one CG-SDT procedure, the UE may apply different comparison rules for different types of CG-UL transmissions. For examples, the UE may apply different rules to the CG-UL transmissions delivered via a UL configured grant and the CG-UL transmissions delivered via a UL dynamic grant.

It is also noted that, during an RA-SDT procedure, the UE may apply different comparison rules for different types of RA-UL transmissions. For examples, the UE may apply different rules to the RA-UL transmissions delivered via MSGA/MSG3 and the RA-UL transmissions delivered via a UL dynamic grant.

It is also noted that, for FIGS. 13 and 14, the SL transmissions may be associated with one or more NR PC5 interface and/or one or more E-UTRA PC5 interface. The UL transmissions may be associated with one or more NR Uu interface and/or one or more E-UTRA Uu interface, and so a serving cell of the UE (if there is any) may be associated an NR cell or an E-UTRA cell respectively. In addition, the UE may implement the SDT procedure (e.g., CG-SDT procedure/RA-SDT procedure) during the NR RRC Inactive state (i.e., while the UE's serving cell is an NR cell) or the E-UTRA RRC Inactive state (i.e., while the UE's serving cell is an E-UTRA cell).

SL-related signaling exchange during an SDT procedure is described below. In this aspect of the present disclosure, certain SL related signaling may be transmitted to the serving cell during an SDT procedure. Also, the SRB1 may be activated during the SDT procedure.

In one implementation of the present disclosure, SLUEInformationNR/SLUEInformationEUTRA is enabled. In the present implementation, a UE may be enabled/configured (e.g., pre-defined according to the 3GPP technical specification or being configured/enabled by the serving cell/anchor cell) to transmit SL-related UE Information during an SDT procedure. In the AS layer, the SL-related UE information may be transmitted via SRB1 while the SRB1 is active/activated during an SDT procedure.

In some implementations, the SL-related UE information may include NR SL UE information (e.g., SLUEInformationNR), which may be used to indicate a UE's requests/interests to support NR SL communication service.

In some implementations, the SL-related UE information may include E-UTRA SL UE information (e.g., SLUEInformationEUTRA), which may be used to indicate a UE's requests/interests to support E-UTRA V2X SL communication service or E-UTRA SL communication/discovery services.

In some implementations, a UE may be capable to deliver an SLUEInformationNR/SLUEInformationEUTRA message while the UE is in the (NR/E-UTRA) RRC Inactive state.

In some implementations, a UE may transmit or be triggered to transmit an SLUEInformationNR/SLUEInformationEUTRA message while the SL operation is impacted by the SDT procedure. For example, during an SDT procedure, a UE may access a UL-BWP that has different numerology (e.g., subcarrier spacing, cyclic prefix length) with the operation of an SL-BWP in the same frequency carrier. Under this condition, the SL operation (e.g., SL transmission/reception) may be interrupted/stopped due to a congestion event between the UL transmission and SL transmission/reception. Under this condition, the UE may transmit UE assistance information (e.g., SidelinUEInformationNR/SLUEInformationEUTRA) to indicate the UE's preference about SL bandwidthpart (e.g., including the UE's preference about numerology, subcarrier spacing, cyclic prefix length, etc). In some implementations, the UE may further request SL resource configurations (e.g., sl-TxPoolSelectedNormal) on one or more SL frequency carrier(s) by transmitting a SidelinUEInformationNR/SLUEInformationEUTRA message during an SDT procedure. In some implementations, the UE may also report a cause value (e.g., "SL/UL congestion") to inform the serving cell to reconfigure the SL configuration and/or SDT configuration.

In one implementation of the present disclosure, SLUEInformationNR/SLUEInformationEUTRA is disabled.

In the present implementation, a UE is capable/enabled to implement NR SL communication service and/or LTE (V2X) SL communication service (e.g., being configured by an upper layer, such as the application layer or NAS layer).

In some implementations, the UE is disabled (or may not be allowed) to transmit the SL-related UE information during an SDT procedure even while the SRB1 is active/resumed during the SDT procedure.

In some implementations, the UE may be disabled/configured (e.g., pre-defined according to the 3 GPP technical specification or being configured/enabled by the serving cell/anchor cell) not to transmit the SL-related UE information during an SDT procedure while the SRB1 is active/resumed during the SDT procedure.

In some implementations, the UE may not generate SL-related UE information for transmission during an SDT procedure since the UE is staying in the RRC Inactive state.

In some implementations, the serving cell may indicate whether the UE is configured/enabled/disabled to transmit SLUEInformationNR/SLUEInformationEUTRA during an SDT procedure via (at least) an explicit signaling (e.g., as part of an SDT configuration in UE-specific RRC signaling; as part of an SL configuration in broadcasting SL-related system information (SIB12/SIB13/SIB14), in UE-specific RRC signaling; or as part of SL pre-configuration). In some other implementations, whether the UE is configured/enabled/disabled to transmit SLUEInformationNR/SLUEInformationEUTRA during an SDT procedure may be directly defined in the 3GPP technical specification and so the UE may implement SL-related UE information during an SDT procedure directly.

In some implementations, the UE would deliver SLUEInformationNR to the serving cell during an SDT procedure only when the serving cell supports NR SL communication service (e.g., in the SIB1 broadcast by the serving cell, the serving cell has indicated that NR SL SIB, such as SIB12, could be delivered via broadcasting or an on-demand procedure).

In some implementations, the UE would deliver SLUEInformationEUTRA to the serving cell during an SDT procedure only when the serving cell supports E-UTRA V2X SL communication service (e.g., in the SIB1 broadcast by the serving cell, the serving cell has indicated that E-UTRA V2X SL SIB (e.g., SIB13 or SIB14) could be delivered via broadcasting or an on-demand procedure).

In one implementation of the present disclosure, an SL buffer status may be reported during an SDT procedure. In the present implementation, a UE may be enabled or configured to transmit an SL Buffer Status Report (e.g., via one or more SL Buffer Status Report (SL BSR) Medium Access Control (MAC) Control Element (CE)) to the serving cell during an SDT procedure.

In some implementations, the UE may be enabled or configured by the serving cell via UE-specific downlink control signaling (e.g., RRC message, such as RRCConfiguration message, RRCRelease message) to transmit SL buffer status report to the serving cell during an SDT procedure.

In some other implementations, the UE may not be allowed or configured to transmit SL Buffer Status Report during an SDT procedure.

In some implementations, the UE may count the pending data amount of the logical channels which are configured or enabled for SL packet transmission during RRC Inactive state. In contrast, the UE may not count the pending data amount of the logical channels which are not configured or enabled for SL packet transmission during RRC Inactive state.

In one implementation of the present disclosure, an SL configured grant configuration may be transmitted to a UE during an SDT procedure. In the present implementation, during an SDT procedure, a UE may receive Type 1 SL configured grant configuration from the serving cell via UE-specific DL control signaling (e.g., via an RRCReconfiguration message).

In one implementation of the present disclosure, an SL configured grant may be activated or de-activated during an SDT procedure. In the present implementation, a UE may store the SL configured grant configurations which the UE has received while staying in the RRC Connected state. In some additional implementations, the stored SL configured grant configurations may include Type 1 SL configured grant and/or Type 2 SL configured grant. In some implementations, the UE in the RRC_Inactive state may apply the stored SL configuration grant configurations, of which the UE may receive when the UE was in the RRC_Connected state. In some implementations, whether the UE in the RRC_Inactive state may apply the stored SL configuration grant configurations, of which the UE may receive when the UE was in the RRC_Connected state, may be configured or activated by the network.

In some implementations, the UE may receive the (Type 1/Type 2) SL configured grant configurations for RRC Inactive state via one or more UE-specific RRC signalings (e.g., RRCReconfiguration message and/or RRCRelease message). In some additional implementations, the UE may receive one and more SL configured grant configurations via an RRCReconfiguration message. In some implementations, each SL configured grant configuration may be associated with a specific index. Then, in the RRCRelease message reception (e.g., an RRCRelease message with suspendconfiguration, which instructs the UE to move to the RRC Inactive state), the serving cell may further indicate a subset of SL configured grant configurations (among all of the configured SL configured grants) by indicating the indexes of these SL configured grant configurations. In some implementation, the network may instruct the usage of a configured grant configuration while in the RRC_INACTIVE or RRC_IDLE state. For example, the network may indicate a configured grant configuration to be used for SL Buffer Status Reporting in the RRC_INACTIVE or RRC_IDLE state (or in an SDT procedure).

In some implementations, during an SDT procedure, the UE may receive one or more downlink control signaling (e.g., Downlink Control Information, DCI) from the serving cell to activate one or more of the configured (Type 2) SL configured grant configurations. In some additional implementation, the UE may also receive one or more downlink control signalings (e.g., Downlink Control Information, DCI) from the serving cell to de-activate one or more of the configured (Type 2) SL configured grant configurations.

In one implementation of the present disclosure, a dedicated SIB-Request message may be delivered during an SDT procedure. In the present implementation, a UE may be able to deliver a SIB request to the serving cell during an SDT procedure (e.g., a RA-SDT/CG-SDT procedure). In some implementations, whether the UE may be able to deliver a SIB request to the serving cell during an SDT procedure (e.g., RA-SDT/CG-SDT procedure) may be pre-configured or be instructed via dedicated signaling or broadcasting system information. For example, if a system information request for one or more specific SIB (e.g., per-SIB based request) is allowed, the network may broadcast an indication in system information to allow a UE to deliver a SIB request to the serving cell during an SDT procedure. In some implementations, if the SRB1 is activated during the SDT procedure, a UE is (implicitly) allowed to deliver a SIB request to the serving cell during an SDT procedure by using DedicatedSIBRequest message to request for the required SIB(s). If the SRB1 is not activated during the SDT procedure, a UE is (implicitly) not allowed to deliver SIB request to the serving cell during an SDT procedure by using DedicatedSIBRequest message to request for the required SIB(s).

In some implementations, the UE may be enabled or configured to transmit DedicatedSIBRequest message to the serving cell during an SDT procedure (e.g., while the SRB1 is activated during the SDT procedure and for the SI message(s) that, according to the si-SchedulingInfo in the stored SIBL contain at least one required SIB and for which si-BroadcastStatus is set to notBroadcasting). It's noted that the SDT procedure here may be CG-SDT procedure or RA-SDT procedure. Then, after receiving the DedicatedSIBRequest message from the UE side, the serving cell may or may not transmit the requested SIB(s) within the same SDT procedure.

It should be noted that, while the UE initiates the transmission of the DedicatedSIBRequest message to the serving cell, the UE may (or may not) start a T350 with the timer value set to the onDemandSIB-RequestProhibitTimer. The UE would not be allowed to re-initiate a DedicatedSIBRequest message to the serving cell while the T350 is still counting. Then, in this condition, the counting T350 may be stopped while at least one of the following conditions is met:
 i. The SDT procedure is released/terminated.
 ii. The SDT procedure is fallback to a non-SDT procedure.
 iii. The UE obtains the requested SIB successfully.

In some implementations, the UE may be disabled or not be allowed to transmit the DedicatedSIBRequest message during an SDT procedure, even when the SRB1 is active/resumed during the SDT procedure.

In one implementation of the present disclosure, an RA procedure for SDT may be triggered. In the present implementation, a UE may be triggered to initiate an RA procedure for SDT and another RA procedure for system information (e.g., other SI indicated in the SI-SchedulingInfo of SIB1).

In some implementations, the UE may not be able to implement an SDT procedure and an RA procedure (e.g., for SI on-demand procedure) simultaneously. Therefore, in this condition, the UE may need to decide which procedure (e.g., SDT procedure and on-demand SI Request procedure) should be configured as a high priority procedure and the UE may have to implement the high priority procedure earlier than the other one (which has a lower priority in comparison with the high priority procedure).

In some implementations, the UE may decide which procedure (e.g., SDT procedure or SI on-demand procedure) that the UE would initiate first by the UE itself. In other words, it may be considered as a UE implementation.

In some implementations, the SDT procedure (e.g., a CG-SDT procedure or an RA-SDT procedure) may have a higher priority over the SI Request procedure. So, in this condition, the UE may implement SDT procedure firstly for small data transmission.

It should be noted that, in some implementations, different priority levels may be configured to CG-SDT procedure and RA-SDT procedure. For example, the CG-SDT procedure may have a higher priority level (which may be presented by a low priority value in some conditions) than an SI on-demand procedure & SI on-demand procedure may have a higher priority level than RA-SDT procedure. Under certain conditions, the RA-SDT procedure may have a higher priority level than SI on-demand procedure, ad the SI on-demand procedure may have a higher priority level than the CG-SDT procedure.

It should be noted that, under certain conditions, the initiated SDT procedure may be re-directed to another RA procedure (e.g., a fallback instruction transmitted by the serving cell may instruct the UE to fallback to a RRCResume/RRC re-establishment/RRC establishment procedure). Under In this condition, it means the pending SI Request procedure may be postponed also. Then, the UE may start the RA procedure for SI Request after the SDT procedure (which may also include the following subsequent DL/UL data exchange) and the fallback non-SDT procedure is terminated/released.

In some implementations, the SI Request procedure may have a higher priority over the SDT procedure. Under this condition, the UE may implement SI Request (random access) procedure firstly for target system information request. Then, the UE may start the RA-SDT procedure or CG-SDT procedure for small data transmission after the SI Request procedure is terminated/released.

In some implementations, CG-SDT procedure may have a different priority levels with the RA-SDT procedure.

For example, a triggered CG-SDT procedure may have a higher priority than a SI Request (random access) procedure. Then, an SI Request (random access) procedure may have a higher priority than an RA-SDT procedure. So, while congestion issue happens in the AS layer (e.g., within a MAC entity or in the PHY layer), the UE may decide the sequence of these procedures based on the given priority levels (so the UE would decide the sequence of applied procedures from the highest priority procedure to the lowest priority procedure).

In some implementations, the priority rules (and priority levels) disclosed in this disclosure may be pre-defined in technical specifications, pre-installed in memory module of the UE side, or configured by the serving cell via at least one UE-specific DL control signaling or broadcasting system information.

In one implementation of the present disclosure, an SI on-demand procedure may be triggered. In the present implementation, a UE may also be able to trigger SI on-demand procedure in parallel with an SDT procedure in the physical domain, such as in the time domain and/or frequency domain).

In some implementations, the UE may transmit an RRC-SystemInfoRequest message during a CG-SDT procedure (e.g., via a UL configured grant and/or the subsequent UL packet transmission during the SDT procedure) or during an RA-SDT procedure (e.g., via MSG3 and/or the UL dynamic grant transmitted by the serving cell during the subsequent data transmission after the RRCResumeRequest message is transmitted to the serving cell).

In some implementations, the RRCSystemInfoRequest message may be encoded and/or multiplexed jointly (by the UE) with the RRC message (e.g., RRCResume procedure) which triggers the SDT procedure.

The UE may consider the SI on-demand procedure is terminated successfully after receiving an acknowledgment message (e.g., HARQ ACK message) from a lower layer of the UE side.

In some implementations, a running SDT procedure may be terminated if the SI on-demand procedure (which is triggered during the SDT procedure) fails. In some other implementations, a running SDT procedure may not be terminated even if the UE considers the SI on-demand procedure fails, and so the running SDT procedure may continue.

In one implementation of the present disclosure, an SL communication may have an impact on an RRC Resume Procedure. In the present implementation, a UE (e.g., in the RRC_INACTIVE state) may initiate an RRC Resume procedure while the UE is triggered (e.g., by the NAS layer or the application layer) to implement an NR SL communication service or an LTE V2X SL communication service.

For example, during the following conditions:
For NR SL communication an RRC connection is resumed only in the following cases:
1> if configured by upper layers to transmit NR SL communication and related data is available for transmission:
2> if the frequency on which the UE is configured to transmit NR SL communication is included in slFreqInfoList within SIB12 provided by the cell on which the UE camps; and if the valid version of SIB12 does not include sl-TxPoolSelectedNormal for the concerned frequency;
For V2X SL communication an RRC connection resume is initiated. only when the conditions specified for V2X SL communication in subclause 5.3.3.1a of Citation 13 are met.
NOTE: Upper layers initiate an RRC connection resume. The interaction with NAS is left to UE implementation."

In some implementations, it may be left to UE implementation to decide whether to initiate an RRCResume procedure (e.g., based on the configured conditions, for SLUEInformationNR/SLUEInformationEUTRA transmission), or the UE may transmit SLUEInformationNR/SLUEInformationEUTRA during the SDT procedure.

In some other implementations, the UE may configure one of the procedures as a high priority procedure. For example, the UE may configure a high priority procedure among SLUEInformationNR/SLUEInformationEUTRA transmissions via an SDT procedure and RRC Resume procedure for SLUEInformationNR/SLUEInformationEUTRA transmission. In addition, the UE may tend to implement SLUEInformationNR/SLUEInformationEUTRA via the high priority procedure first. In some implementations, the UE may try to deliver the SLUEInformationNR/SLUEInformationEUTRA transmission via a (configured) low priority procedure only when the high priority procedure fails. For example, when an SLUEInformationNR/SLUEInformationEUTRA transmission during an SDT procedure fails, the UE may have to initiate an RRC Resume procedure for SLUEInformationNR/SLUEInformationEUTRA transmission.

In some other implementations, the serving RAN (e.g., the anchor cell of the UE) may configure which procedure is a high priority service (in SLUEInformationNR/SLUEInformationEUTRA) via broadcasting system information or via UE specific DL control signaling (e.g., via an SL-ConfigDedicatedNR in an RRCReconfiguration message).

In some implementations, the UE may implement and/or initiate a low priority procedure (e.g., an RRC Resume procedure for SLUEInformationNR/SLUEInformationEUTRA transmission) only after the high priority service (e.g., an SLUEInformationNR/SLUEInformationEUTRA transmission during an SDT procedure) fails.

It should be noted that the proposed SL-related signaling may be transmitted or re-transmitted during a CG-SDT procedure or an RA-SDT procedure (which may be a 2-step RA-SDT procedure or a 4-step RA-SDT procedure).

SL/UL Prioritization Rules are described below. In this aspect of the present disclosure, certain prioritization rules among the SL synchronization signal (S-SS), Physical SL Broadcast Channel (PSBCH), and UL packet transmissions (e.g., Physical Uplink Shared Channel (PUSCH)/Physical Uplink Control Channel (PUCCH)) are discussed.

The following are S-SS/PSBCH Prioritization Rules. In the present implementation, a priority of an SL synchronization signal (S-SS/PSBCH block transmission or reception) is provided by sl-SSB-PriorityNR. The range of sl-SSB-PriorityNR is between 1 (e.g., the highest priority) and 8 (e.g., the lowest priority).

The SL S-SS/PSBCH transmission/reception has a higher priority (level) than the UL transmission if the priority value of the SL S-SS/PSBCH transmission/reception is smaller than the sl-PriorityThreshold value (which may be configured with the SL resource pool configuration and each SL resource pool configuration may be associated with an sl-PriorityThreshold). Otherwise, the UL transmission (e.g., UL transmission during the SDT procedure, which may be RA-SDT procedure or CG-SDT procedure) may have a higher priority than the SL transmission or reception.

In some implementations, the value of sl-SSB-PriorityNR may be transmitted via UE specific downlink control signaling (e.g., via SL-ConfigDedicatedNR in an RRCReconfiguration message). In some other implementations, the value of sl-SSB-PriorityNR may be transmitted via common broadcasting system information (e.g., SL-ConfigCommonNR in a SIB12 broadcast by an NR Cell). In some implementations, the value of sl-SSB-PriorityNR may be configured as part of the SDT configuration.

In some further implementations, the value of sl-SSB-PriorityNR may be pre-installed in the memory module of the UE side (e.g., pre-installed in SL pre-configuration).

In one implementation of the present disclosure, S-SS/PSBCH transmission/reception may always have a high or low priority. In the present implementation, during an SDT procedure, SL S-SS/PSBCH may have a higher priority than the small data transmission/re-transmission (which may also include the preamble/MSG3 with payload/subsequent data transmission/reception during the SDT procedure, and the (DL/UL) HARQ ACK/NACK transmission/reception corresponding to the (re)transmitted small data before the SDT procedure is terminated).

In some implementations, the sl-SSB-PriorityNR may not be implemented during the small data transmission, or the UE may ignore or skip the configured sl-SSB-PriorityNR. After the small data transmission procedure is terminated/released/interrupted (or the SDT procedure is considered fails), the UE may re-apply the given sl-SSB-PriorityNR (if it is configured).

In some implementations, the serving cell may indicate whether the UE should keep applying the sl-SSB-PriorityNR during an SDT procedure. For example, the serving cell may configure the UE to skip the sl-SSB-PriorityNR during an SDT procedure. As a result, SL S-SS/PSBCH transmission/reception may have a higher priority than the small data transmission/reception.

In some other implementations, the serving cell may configure small data transmission/reception (e.g., CG-SDT procedure/RA-SDT procedure/RRC-less SDT procedure and the subsequent data transmission/reception during the SDT procedure) to always have a higher priority than SL S-SS/PSBCH.

It should be noted that, in some implementations, different priority levels may be configured to CG-SDT and RA-SDT procedures. For example, the priority level of a CG-SDT procedure may be higher than an S-SS/PSBCH transmission/reception, and the priority level of an S-SS/PSBCH transmission/reception may be higher than an RA-SDT procedure. In some other implementations, it is possible that the priority level of an RA-SDT procedure may be higher than an S-SS/PSBCH transmission/reception, and the priority level of an S-SS/PSBCH transmission/reception may be higher than a CG-SDT procedure.

In one implementation of the present disclosure, a UE may follow the sl-SSB-PriorityNR rules during an SDT procedure. The sl-SSB-PriorityNR rules may be defined in the 3GPP technical specification in some implementations. The SDT procedure may be a CG-SDT procedure and/or an RA-SDT procedure.

In some implementations, the serving cell may indicate to the UE that the UE should keep applying sl-SSB-PriorityNR during an SDT procedure. For example, the serving cell may explicitly configure the UE to keep the sl-SSB-PriorityNR during an SDT procedure (e.g., as part of the SDT configuration).

In some other implementations, the UE may implicitly implement SL operations and small data transmission procedures by following the sl-SSB-PriorityNR rules.

In one implementation of the present disclosure, a new or additional priority value for S-SS/PSBCH (e.g., sl-SSB-PriorityNR_SDT) may be explicitly or implicitly configured to the UE (e.g., via UE-specific DL RRC signaling or broadcasting system information) or be pre-installed in the SL pre-configuration. The UE may apply the sl-SSB-PriorityNR_SDT value to decide whether to implement S-SS/PSBCH transmission/reception on a target SL resource pool during an SDT procedure.

In some implementations, the given S-SS/PSBCH Prioritization Rules may be applied to an RRC-based SDT procedure and/or an RRC-less SDT procedure. In some implementations, the given S-SS/PSBCH Prioritization Rules may be applied during an SDT procedure (e.g., which covers the subsequent data exchange during the SDT procedure). In some implementations, it may be left to UE implementation to decide which rule(s) to apply.

Certain prioritization rules for random access-related transmission and SL transmission/reception are described below.

For RA-related prioritization rules, in the 3GPP technical specifications, it states that "A PRACH transmission, or a PUSCH scheduled by an UL grant in a RAR and its retransmission, or a PUSCH for Type-2 random access procedure and its retransmission, or a PUCCH with HARQ-ACK information in response to successRAR, or a PUCCH indicated by a DCI format 1_0 with CRC scrambled by a corresponding TC-RNTI has higher priority than an SL transmission or reception." A UE may implement an SDT procedure (e.g., a CG-SDT or RA-SDT procedure) with an SL transmission/reception jointly. So, the UE may need to decide which procedure (e.g., SDT procedure or SL packet exchange) every time when a congestion event happens (in Layer-1 or Layer-2, for example, due to the hardware limitations in the UE side).

In one implementation of the present disclosure, RA-SDT is always prioritized over SL transmission/reception. In the present implementation, a RACH with PUSCH transmission for small data transmission (e.g., a RA-SDT procedure with or without subsequent DL/UL packet exchange) may always have a high priority than an SL transmission/reception.

In some implementations, an SDT procedure (e.g., RA-SDT procedure) may always have a higher priority than an SL transmission/reception. Thus, the UE may not implement an SL transmission/reception if it collides with (any part of) an SDT procedure (e.g., RA-SDT procedure) in physical resources (e.g., in time domain and/or frequency domain). The UE may implement the SDT procedure first.

In some implementations, the UE may be configured (e.g., as part of an SDT configuration) or pre-defined according to the 3GPP technical specification such that an RA-SDT procedure may always have a higher priority than an SL transmission/reception.

In one implementation of the present disclosure, CG-SDT is always prioritized over SL transmission/reception. In the present implementation, an SDT procedure may always have a higher priority than an SL transmission/reception. In some implementations, a CG-SDT procedure may always have a higher priority than an SL transmission/reception. Thus, the UE may not implement an SL transmission/reception if it collides with (any part of) an SDT procedure (e.g., a CG-SDT) in physical resources (e.g., in time domain and/or frequency domain). The UE may implement the SDT procedure first.

In some implementations, the UE may be configured (e.g., as part of an SDT configuration) or pre-defined according to the 3 GPP technical specification such that a CG-SDT procedure may always have a higher priority than an SL transmission/reception.

In one implementation of the present disclosure, RA procedure may have a lower priority than SL transmission/reception during an SDT procedure. In the present implementation, at least one Physical Random Access CHannel (PRACH) transmission triggered during an SDT procedure (or a CG-SDT procedure) may have a lower priority than an SL transmission/reception.

For example, in some implementations, a (2-step/4-step) random access procedure, which is triggered for an SDT procedure, may have a lower priority than an SL transmission/reception.

Therefore, the UE may not implement a (2-step/4-step) random access procedure if it collides with an SL transmission/reception in physical resources (e.g., in time domain and/or frequency domain). The UE may implement the SL transmission/reception first.

In some conditions, the UE may decide to implement SL transmission/reception instead, if the UE is not capable to implement both of them simultaneously (e.g., in a slot, a subframe, or a radio frame).

In one implementation of the present disclosure, one or more specific priority values are configured for an SDT Procedure. In the present implementation, an SDT procedure may be configured with a priority value based on the multiplexed data (e.g., based on all (or a subset) of the logical channels associated with the multiplexed Packet Data Units (e.g., multiplexed MAC PDUs).

In some implementations, a lower priority value may be mapped to a higher priority level. In some other implementations, a lower priority value may be mapped to a lower priority level.

Then, the UE may decide whether to prioritize a (2-step/4-step) random access procedure over an SL Rx/Tx, if the priority value of the UL packets (to be transmitted via RA-SDT/CG-SDT procedure) is lower than (or equivalent to) the priority value of a congested SL packet (for transmission/reception). In contrast, the UE may decide whether to prioritize an SL Rx/Tx over the random access procedures (for RA-SDT procedure) or a configured grant transmission (for CG-SDT procedure) if the priority value of the UL packets (to be transmitted via RA-SDT/CG-SDT procedure) is higher than (or equivalent to) the priority value of the congested SL packet (for transmission/reception).

The (SL operation) priority value for an SDT procedure may be configured as part of an SDT configuration via dedicated UE specific DL control signaling or via broadcasting system information.

In some implementations, the (SL operation) priority value for an SDT procedure may be configured as part of SL parameters, which may be configured via dedicated UE specific DL control signaling (e.g., the SL-ConfigDedicatedNR in an RRCReconfiguration message) or broadcasting system information (e.g., SIB12).

In some implementations, the UE may trigger an RA-SDT or CG-SDT procedure while the target UL packet(s) has a higher priority (level) over an SL Rx/Tx. In some implementations, the UE may transmit or receive one or more SL packets instead (rather than initiating an SDT procedure), if the one or more SL packets have a higher priority (level) over the pending UL packets (which may be capable for RA-SDT/CG-SDT procedure).

In one implementation of the present disclosure, a PUSCH may be scheduled by an UL grant in an RAR message. In the present implementation, at least one PUSCH scheduled by an UL grant in a RAR and its retransmission (during an SDT procedure) may have a lower priority than an SL Rx/Tx. In some conditions, that the UE may decide to implement an SL Rx/Tx instead, if the UE is not capable to implement both of them simultaneously or in the same slot, subframe, or radio frame.

In some implementations, at least one PUSCH scheduled by an UL grant in an RAR message and its retransmission (during an SDT procedure) may have a higher priority than an SL Rx/Tx. In some conditions, the UE may decide to implement a PUSCH transmission (scheduled by an UL grant in an RAR message), rather than an SL Rx/Tx (during the SDT procedure), if the UE is not capable to implement both of them simultaneously or in the same slot, subframe, or radio frame.

In one implementation of the present disclosure, at least one PUSCH for Type-2 random access procedure and its retransmission (during an SDT procedure) may have a lower priority than an SL Rx/Tx. In some conditions, the UE may decide to implement an SL Rx/Tx instead if the UE is not capable to implement both of them simultaneously or in the same slot, subframe, or radio frame.

In some implementations, at least one PUSCH for Type-2 random access procedure and its retransmission (during ab SDT procedure) may have a higher priority than an SL Rx/Tx. In some conditions, the UE may decide to implement a PUSCH for Type-2 random access procedure and its retransmission (during an SDT procedure), rather than an SL Rx/Tx (during the SDT procedure), if the UE is not capable to implement both of them simultaneously or in the same slot, subframe, or radio frame.

In one implementation of the present disclosure, at least one PUCCH with HARQ-ACK information in response to successRAR reception (during an SDT procedure) may have a lower priority than an SL Rx/Tx. In some conditions, the UE may decide to implement an SL Rx/Tx instead, if the UE is not capable to implement both of them simultaneously or in the same slot, subframe, or radio frame.

In some implementations, at least one PUCCH with HARQ-ACK information in response to successRAR reception (during an SDT procedure) may have a higher priority than an SL Rx/Tx. In some conditions, the UE may decide to implement a PUCCH with HARQ-ACK information in response to successRAR reception, rather than an SL Rx/Tx (during an SDT procedure), if the UE is not capable to implement both of them simultaneously or in the same slot, subframe, or radio frame.

In one implementation of the present disclosure, a PUCCH may be indicated by a DCI format 1_0 with CRC scrambled by a corresponding TC-RNTI. In the present implementation, at least one PUCCH indicated by a DCI format 1_0 with CRC scrambled by a corresponding TC-RNTI during an SDT procedure may have a lower priority than an SL Rx/Tx. In some conditions, the UE may decide to implement an SL Rx/Tx instead if the UE is not capable to implement both of them simultaneously or in the same slot, subframe, or radio frame.

In some implementations, at least one PUCCH indicated by a DCI format 1_0 with CRC scrambled by a corresponding TC-RNTI during an SDT procedure may have a higher priority than an SL Rx/Tx. In some conditions, the UE may decide to implement an PUCCH indicated by a DCI format 1_0 with CRC scrambled by a corresponding TC-RNTI, rather than an SL Rx/Tx (during the SDT procedure), if the UE is not capable to implement both of them simultaneously or in the same slot, subframe, or radio frame.

In some implementations, the Random Access-related prioritization rules may be applicable to the RRC-based SDT procedures and/or RRC-less SDT procedures. The prioritization rules above may also be applicable to RA-SDT/CG-SDT procedures. In some implementations, different priority levels may be configured to CG-SDT/RA-SDT procedures.

In various implementations of the present disclosure, an SL Rx/Tx may include any combinations of:
  a. Rx/Tx of ($1^{st}/2^{nd}$ stage)) SL control information within Physical SL Control Channels (PSCCHs) and Physical SL Shared Channels (PSSCHs);

b. Rx/Tx of SL packet transmission/reception within Physical SL Shared Channels (PSSCHs);
c. SL HARQ Feedback within Physical SL Feedback Channels (PSFCHs);
d. sensing mechanisms or partial sensing mechanisms before SL packet transmissions;
e. SL Channel State information-Reference Signal (CSI-RS) measurements and reports.

In some implementations, different steps during an SDT procedure may apply different prioritization rules while a congestion event happens during the SDT procedure. For example, a PUSCH scheduled by a UL grant in an RAR and its retransmission, or a PUSCH for Type-2 random access procedure and its retransmission (which may convey the RRCResumeReqeust to start an SDT procedure with or without UL (SDT) packet(s)), may always have high priority levels in comparison with an SL Rx/Tx, and so the initiation of an SDT procedure may always have a higher priority in comparison with an SL Rx/Tx. However, in the subsequent data exchange during the SDT procedure, the UE may decide which procedure (UL transmission or SL Rx/Tx) based on the given sl-PriorityThreshold (and so sometimes the UE may implement an SL operation, rather than a UL transmission, during the SDT procedure if the SL packet(s) has a lower priority value in comparison with the sl-PriorityThreshold) (e.g., SL operation has a higher priority level in comparison the subsequent UL packet transmission (or HARQ feedback(s) associated with a subsequent DL packet transmission)). Also, it should be noted that these prioritization rules may also apply to CG-SDT procedures.

Prioritization rules for SL packet transmission/reception are described below. In this aspect of the present disclosure, certain prioritization rules between the SL packet transmissions and UL packet transmissions (e.g., via CG-SDT procedure/RA-SDT procedure) are discussed.

For prioritization rules for SL packet transmission/reception, in the 3GPP technical specifications, it states that "When one or more SL transmissions from a UE overlap in time with multiple non-overlapping UL transmissions from the UE, the UE performs the SL transmissions if at least one SL transmission is prioritized over all UL transmissions subject to the UE processing timeline with respect to the first SL transmission and the first UL transmission." "When one or more UL transmissions from a UE overlap in time with multiple non-overlapping SL transmissions, the UE performs the UL transmissions if at least one UL transmission is prioritized over all SL transmissions subject to the UE processing timeline with respect to the first SL transmission and the first UL transmission."

For simultaneous NR SL communication and UL transmission, an SL priority threshold may be configured with the SL (transmission/reception) resource pool configuration. The SL resource pool configuration may include a normal resource pool configuration and/or an exceptional resource pool configuration. In some additional implementations, the priority threshold may also be applied to (Type 1/Type 2) SL configured grant configurations and SL dynamic grants. For example, the SL configured grant configuration and SL dynamic grants may be applicable during SDT procedure and/or while SDT procedure is not initiated.

"sl-PriorityThreshold" Indicates the threshold value used to determine whether NR SL transmission is prioritized over uplink transmission of priority index 0 as specified in Citation 1, clause 16.2.4.3, or whether PUCCH transmission carrying SL HARQ is prioritized over PUCCH transmission carrying UCI of priority index 0 if they overlap in time as specified in Citation 1, clause 9.2.5.0."

In some implementations, the sl-PriorityThreshold may be configured with the SL (transmission/reception) resource pool configurations (e.g., SL-ResourcePool configurations) in UE-specific dedicated control signaling (e.g., RRCReconfiguration message), broadcast control signaling (e.g., system information, such as SIB12) or SL pre-configuration.

In some implementations, the UE may be configured with priority rules to address the congestion issues between SL communication and UL transmission while the UE is not capable to implement SL (transmission/reception) for SL packet (transmissions/receptions) & UL transmissions (e.g., due to hardware limitations or power limitations).

It should be noted that different prioritization rules may be configured in different sub-layers. For example, in some prioritization rules may be configured in the PHY-related (Layer-1) specifications (e.g., 3GPP TS 38.213) when the congestion events (between the SL/UL) are observed in the PHY layer. In other examples, prioritization rules may be configured in the MAC-related specifications (e.g., 3GPP TS 38.321) when the congestion events (between the SL/UL) are observed in the MAC layer (Layer-2) (e.g., within a MAC entity). In some implementations, the UE may only implement either Layer-2 (or Layer-1) priority rules. In some other implementations, the UE may implement both Layer-2 & Layer-1 prioritization rules.

In some implementations, each SL logical channel may be associated with an SL priority value (e.g., ranging from 1~8, a lower value means a higher priority). So, for a multiplexed MAC PDU, the priority of the MAC PDU is decided based on the SL priority value of the highest priority of logical channel(s) or a MAC CE associated with the multiplexed MAC PDU.

In one implementation of the present disclosure, a UE may adopt or reuse the existing SL/UL prioritization rules during an SDT procedure (e.g., CG-SDT/RA-SDT procedure).

In some implementations, the UE may reuse the SL/UL prioritization rules implicitly or explicitly during an SDT procedure.

In some other implementations, the UE may reuse the SL/UL prioritization rules based on the instructions or configurations of one or more explicit signalings from the serving cell (e.g., via DL Radio Resource Control (RRC) signaling, such as an RRCReconfiguration message with or without a reconfigurationwithsync IE, an RRCSetup message, an RRCResume message, an RRC Re-establishment message, an RRCRelease message, or broadcasting system information).

Under this condition, the configured SL priority values associated with each SL logical channels and the priority rules (e.g., based on the same given "sl-PriorityThreshold" associated with SL resource pools) may be applied during an SDT procedure (e.g., CG-SDT/RA-SDT procedure).

In one implementation of the present disclosure, a UE may reuse the existing SL prioritization rules based on different threshold configurations. In the present implementation, a UE may also follow the prioritization rules during an SDT procedure with another set of configured prioritization values, which may be configured independently. So, different SL priority thresholds may be configured to each of an SDT procedure and a non-SDT procedure.

For example, an SL threshold: sl-PriorityThreshold SDT may be configured (e.g., as part of an SDT procedure or as part of an SL (pre-)configuration) to compare the priorities of multiplexed SL MAC PDUs and UL (small data) packets.

So, the UE may apply the sl-PriorityThreshold SDT value during an SDT procedure and the UE may apply sl-PriorityThreshold during a non-SDT procedure (e.g., after receiving fallback instruction from the serving cell while an SDT procedure was initiated by the UE).

In one implementation of the present disclosure, a UE may reuse the sl-PriorityThreshold to decide the priorities between an RA-SDT procedure and an SL transmission. In the present implementation, while a UE is not capable to implement an RA-SDT procedure and an SL transmission/reception simultaneously (or within the same symbol time/slot/subframe/radio frame), the UE may decide whether to initiate an RA-SDT procedure or SL transmission/reception based on a given sl-PriorityThreshold value. In some implementations, this mechanism may be considered as part of access control for an SDT procedure.

For example, when one or more SL transmissions/receptions in one or more SL resource pools from a UE overlap in time with one or more non-overlapping RACH resource configurations, which are configured for an RA-SDT procedure from the UE, the UE performs the SL transmissions/receptions if at least one SL transmission/reception is prioritized over all RA-SDT procedures (e.g., the SL priority value of the concerned PHY packet or MAC PDU is lower (or equivalent to) the given sl-PriorityThreshold) subject to the UE processing timeline with respect to the first SL transmission and the RA-SDT procedure.

In some implementations, the UE performs the RA-SDT procedure if RA-SDT procedure is prioritized over (all of) the SL transmissions/receptions (e.g., all of the SL priority values of the concerned PHY packets or MAC PDUs are higher (or equivalent to) the given sl-PriorityThreshold) subject to the UE processing timeline with respect to the first SL transmission and the RA-SDT procedure.

In some implementations, the UE may reduce the power for the RA-SDT procedure prior to the start of the RA-SDT procedure (e.g., the initial MSGA/MSG1 transmission or the following RA-SDT procedure, which may or may not include the subsequent UL packet transmission and (HARD) ACK/NACK transmission during the RA-SDT procedure), if the SL transmission has a higher priority than the UL transmission (which may be decided also based on the sl-PriorityThreshold), so that the total UE transmission power would not exceed $C_{MAX}$. In some other implementations, the UE may reduce the power for the SL transmission prior to the start of SL transmission if the SL transmission has a lower priority than the RA-SDT procedure.

It should be noted that the RA-SDT resource may be (any combinations of) the RACH resource for 2-step RA procedure and 4-step RA procedure.

In one implementation of the present disclosure, a UE may reuse sl-PriorityThreshold to decide the priorities between a CG-SDT procedure and an SL transmission. In the present implementation, a UE is not capable to implement a CG-SDT procedure and an SL transmission/reception simultaneously (or within the same symbol time/slot/subframe/radio frame), the UE may decide whether to implement the CG-SDT procedure or the SL transmission/reception based on a given sl-PriorityThreshold value.

For example, when one or more SL transmissions/receptions in one or more configured SL resource pools from a UE overlap in time (and/or in frequency domain) with one or more non-overlapping configured grant configurations, which are configured for a CG-SDT procedure from the UE, the UE performs the SL transmissions if at least one SL transmission is prioritized over all CG-SDT procedures (e.g., the SL priority value of the concerned SL PHY packet or SL MAC PDU is lower (or equivalent to) than the given sl-PriorityThreshold value) subject to the UE processing timeline with respect to the first SL transmission and the CG-SDT procedure.

In some other implementations, the UE performs the CG-SDT procedure if a CG-SDT procedure is prioritized over all of the (pending) SL transmissions/receptions (e.g., all of the SL priority values of the concerned PHY packets or MAC PDUs are higher (or equivalent to) the given sl-PriorityThreshold value) subject to the UE processing timeline with respect to the first SL transmission and the CG-SDT procedure.

In some implementations, the UE may reduce the power for the CG-SDT procedure prior to the start of the CG-SDT procedure (e.g., the initial UL transmission (via the configured grant) or the subsequent UL packet transmission (via dynamic grants) and (HARD) ACK/NACK transmission during the CG-SDT procedure), if the SL transmission has a higher priority than the UL transmission (e.g., the SL priority value of the concerned SL PHY packet or SL MAC PDU is lower (or equivalent to) the given sl-PriorityThreshold value), so that the total UE transmission power would not exceed $C_{MAX}$. In some other implementations, the UE may reduce the power for the SL transmission prior to the start of SL transmission if the SL transmission has a lower priority than the CG-SDT procedure.

In some implementations, the priority rules may only be applied to an SDT procedure via a given (pre-configured) configured-Grant configuration (e.g., CG-SDT procedure) during the SDT procedure. Under this condition, the UE may apply other priority rules for the RA-SDT procedure.

In some implementations, a UE may apply the priority rules in the initiation of a CG-SDT procedure. Then, the same priority rules may also be applied during the subsequent UL/DL transmission/reception within the SDT procedure. It should be noted that the serving cell may configure the UL grants and DL assignments by DL/UL dynamic grants via Downlink Control Information (DCI). In some other implementations, the prioritization rules may only be applied when the UE is deciding whether to trigger an SDT procedure (e.g., an access control mechanism for SDT procedure initiation).

It should be noted that, in some implementations, the configured sl-PriorityThreshold values to compare the priorities of multiplexed SL packets and SDT procedures (e.g., RA-SDT procedure/CG-SDT procedure) may be configured as part of SL (exceptional/normal) Transmission/Reception resource pool configurations in broadcasting system information (e.g., SIB12). In some other implementations, the sl-PriorityThreshold value may be configured as part of SL pre-configuration. In some other implementations, the configured sl-PriorityThreshold values to compare the priorities of multiplexed SL packets and SDT procedures may be configured via UE-specific control signaling (e.g., an RRCReconfiguration message or an RRCRelease message).

SL BWP Prioritization Rules are described below. In this aspect of the present disclosure, a UE may initiate a CG-SDT/RA-SDT procedure on a configured UL-BWP (which may or may not be the initial BWP of the serving cell). However, the UL-BWP configuration/decision for SDT procedure may also impact SL operation, which are described below.

For SL BWP prioritization rules, in the 3GPP technical specification, it states that "the UE may interrupt SL operation if the active UL BWP numerology is different than the SL BWP numerology." However, "[t]he UE expects to use a same numerology in the SL BWP and in an active UL BWP in a same carrier of a same cell. If the active UL BWP numerology is different than the SL BWP numerology, the SL BWP is deactivated."

In one implementation of the present disclosure, an SL-BWP may have a higher priority than a UL-BWP. In the present implementation, an SL operation may have a higher priority than an SDT. Under this condition, a UE may not de-activate an active SL-BWP while the UE is triggered to initiate an SDT procedure.

In some implementations, the UE may initiate, implement, or realize an SDT procedure (only) when the SL-BWP is de-activated (e.g., the on-going SL service is terminated/ release on the concerned frequency) or the UE switches to another SL-BWP that has the same numerology as the UL-BWP that is configured for the SDT (e.g., via CG-SDT/ RA-SDT) procedure.

In some implementations, within a concerned (SL) frequency carrier, there may be more than one UL-BWP configuration for the UE to implement an SL packet transmission/reception. So, while an SDT procedure is initiated, the UE may (re)select (or switch to) an operating UL-BWP, which has the same numerology as the operating SL-BWP, for the initiated SDT procedure.

In one implementation of the present disclosure, a UL-BWP may have a higher priority than an SL-BWP. In the present implementation, an SDT procedure may have a higher priority than an SL transmission/reception. Under this condition, a UE may de-activate an active SL-BWP while the UE is triggered to implement an SDT procedure on a UL-BWP, which has A different numerology than the SL-BWP.

In some implementations, within the concerned (SL) frequency carrier, there may be more than one SL-BWP configuration for the UE to implement SL packet transmission/reception. So, while an SDT procedure is initiated, the UE may (re)select (or switch to) an operating SL-BWP, which has the same numerology as the operating UL-BWP (of the active SDT procedure).

In one implementation of the present disclosure, a UL-BWP switch may have an impact on SL operations. In the present implementation, a UE may select a (UE-specific) Uplink Bandwidthpart (UL-BWP) for small data transmission. The UL-BWP (for an SDT procedure) may be configured by the serving cell for small data transmission. It is possible that among several UL-BWP (for SDT procedure) configurations, the UE selects a (UE-specific) UL BWP for small data transmission. For example, the UE may select an UL BWP with the same numerology as the numerology of the SL BWP. For another example, the UE may select another UL BWP with different numerologies from the numerology of the SL BWP.

The UL-BWP (configured for SDT) may or may not be the initial UL-BWP of the serving cell. The UL-BWP is associated with a specific numerology (e.g., specific subcarrier spacing, cyclic prefix length).

Based on the condition that a specific UL-BWP is selected for each small data transmission, the UE may use the same UL-BWP for the SL packet transmission/reception (after the SDT procedure is initiated). Thus, the SL-BWP switch may be triggered with the initiation of the SDT procedure. In some further implementations, the UE may or may not switch back to the original SL-BWP (before the SDT procedure is initiated) after the SDT procedure is initiated.

It should be noted that, in some implementations, a UE may change a UL-BWP during an SDT procedure. For example, a UE may switch from a first UL-BWP to a second UL-BWP, which may be instructed by the serving cell via one or more Downlink Control Information (DCIs) during an SDT procedure. Under this condition, the UE may also implement an SL packet transmission/reception on the same switched UL-BWP, where the SL-BWP also changes with the DCI receptions.

It should be noted that, in some implementations, a UL-BWP configured for an SDT may not be configured with any SL transmission/reception radio resources. In such a case, the UE may interrupt/stop SL packet transmission/ reception due to an SDT procedure is initiated, as such the UE may switch to the selected UL-BWP for SDT.

In some other implementations, the UE may stick with a UL-BWP that is configured with SL radio resources but without SDT resources. In such a case, the UE may not be allowed to initiate an SDT procedure unless the on-going SL service (e.g., an NR SL service or an E-UTRA V2X SL communication service) is terminated.

It should be noted that, in some implementations, a UE may be pre-installed by the service priority rules (which impacts the UL-BWP selection) in memory module (e.g., SL pre-configuration). In some other implementations, the UE may receive the service priority rules via broadcast system information (e.g., SIB12 (for NR SL service configuration) or SIB13/SIB14 (for an E-UTRA V2X SL communication service configuration). In some further implementations, the UE may obtain the service prioritization rules via UE-specific Radio Resource Control (RRC) messages.

Frequency Carrier Selection Rules are described below. In this aspect of the present disclosure, to the DL serving frequency carrier, a UE may need to select a target UL frequency carrier for both small data transmission procedure and SL packet transmission/reception. Some of the issues and solutions for UL frequency carrier selection rules are discussed.

In one implementation of the present disclosure, an SDT procedure may have an impact on UL carrier selection. In the present implementation, a UE may select a (Normal) UL Carrier ((N)UL or UL Carrier) or a Supplementary UL Carrier (SUL) associated with a serving DL frequency carrier for small data transmission. In such a case, once the UE selects an operating UL carrier (e.g., NUL or SUL) in the beginning of the SDT procedure (e.g., an RA-SDT procedure or a CG-SDT procedure), then the UE may also implement an SDT on the same UL carrier during the SDT procedure. So, in some implementations, the UE may transmit/receive SL packets on an NUL carrier before an SDT procedure. Then, the UE may switch to an SUL carrier for SL packet transmission/reception after the UE initiating an SDT procedure and the SDT procedure is operating on the SUL carrier. In some other implementations, the UE may transmit/receive SL packets on the SUL carrier before the SDT procedure. Then, the UE may switch to an NUL carrier for SL packet transmission/reception after the UE initiating an SDT procedure and the SDT procedure is operating on the NUL carrier. Based on the UL carrier that the UE selects or is configured to perform the SDT procedure, the UE may switch the UL carrier to perform SL communication so that the UE may perform the SDT procedure and SL communication on the same carrier.

It should be noted that, in some implementations, after the SDT procedure, the UE may re-decide the operating carrier (e.g., an NUL/SUL carrier) for SL packet transmission/ reception (e.g., while the SL resource configuration may configured only in the NUL carrier or SUL carrier). In some implementations, the UE may also access DL-RSRP threshold to decide the SL operation frequency carrier if SL resource configuration is configured on both NUL carrier and SUL carrier.

In some other implementations, the UE may not re-decide the operating carrier (e.g., NUL/SUL) for SL packet transmission/reception.

In one implementation of the present disclosure, different frequency carriers may be prioritized for difference services. In the present implementation, a UE may switch to an NUL or SUL carrier for SL packet exchange (e.g., to align with the operating UL carrier during an SDT procedure). However, it is possible that no SL resource configuration (e.g., SL transmission resource pool or SL configured grant) is configured on the operating UL carrier of the SDT. Then, in some cases, the UE may interrupt, stop, or terminate the SL packet transmission/reception if the UE is not able to implement UL packet transmission (for the SDT procedure) and SL operation on more than one carrier. For example, the UE could only operate on a UL carrier for both UL transmission (SDT procedure) and SL packet transmission. In other words, in such a case, a small data transmission procedure has a higher priority than an SL packet exchange.

In some implementations, a UE may switch to an NUL or SUL carrier for SL packet exchange (e.g., to align with the operating UL carrier during an SDT procedure). However, it is possible that no SL resource configuration (e.g., SL transmission resource pool or SL configured grant) is configured on the operating UL carrier of the SDT. Then, in some cases, the UE may not apply or initiate the SDT procedure if the SL data exchange may be interrupted by the SDT procedure. Instead, the UE may apply or initiate an SDT procedure (on the selected UL carrier) while the SL service (e.g., an NR SL service or a E-UTRA V2X SL communication service) is finished/terminated. In other words, in such a case, an SL packet exchange has a higher priority over a small data transmission procedure.

It should be noted that, in some implementations, a UE may be pre-installed by the service prioritization rules (that may impact the UL frequency carrier selection) in memory module, for example, in an SL pre-configuration. In some other implementations, the UE may receive the service prioritization rules via broadcast system information (e.g., SIB12 for an NR SL service configuration or SIB13/SIB14 for an E-UTRA V2X SL communication service configuration). In some further implementations, the UE may obtain the service prioritization rules via UE-specific Radio Resource Control (RRC) messages.

SL/UL Timing Adjustment Rules are described below. In this aspect of the present disclosure, the mutual impacts of SL timing adjustment and UL timing adjustment when an SDT procedure is jointly considered are discussed.

According to SL/UL timing adjustment rules, in the present implementation, a UE may maintain a valid UL timing advance value (e.g., $N_{TA}$ in the 3GPP technical specification), which the UE would be applied while the UE starts an SDT procedure by using a configured UL configured grant configuration, that is also (pre-)configured for the SDT. In this disclosure, the UL timing advance value for CG-SDT is called $N_{TA, CG-SDT}$.

In addition, the UE may also maintain an SDT Timing Advance Timer (SDT-TAT), which indicates whether the UL timing advance, for example, for CG-SDT resource allocation. In some implementations, the UE may be enabled, allowed, or configured to access one or more CG-SDT resources for small data transmission only if the SDT-TAT is still counting. In other words, the UE may not be enabled, allowed, or configured to access the one or more CG-SDT resources for small data transmission after the SDT-TAT expires. Thus, when the SDT-TAT expires, the UL timing maintained by the UE becomes invalid, so the UE would drop the invalid UL-timing advance (configured for the SDT procedure) after the SDT-TAT expires. For example, the UE may drop or release the maintained $N_{TA, CG-SDT}$ value. Then, in the next UL data transmission, which may be a conventional RRC procedure or another small data transmission procedure, the UE may initiate the MSG1/MSGA transmission by applying a default $N_{TA}$ value (e.g., by configuring $N_{TA}=0$). It should be noted that, in some further implementations, the UE may still keep the $N_{TA, CG-SDT}$ value for the following UL packet transmissions even after the SDT-TAT expires, which means that the UE would not be allowed to access the CG-SDT resource for small data transmission. However, the UE may keep the $N_{TA, CG-SDT}$ as the UL timing for MSG1/MSGA transmission in the following random access procedure, which may be an SDT procedure (e.g., an RA-SDT procedure) or a non-SDT procedure (e.g., a RAN Notification Area Update procedure).

In some implementations, during an RA-SDT procedure, a UE may trigger an RA-SDT procedure, which may be a 2-step RA procedure or a 4-step RA procedure, to transmit small data. In addition, the UE may obtain a UL timing advance command (e.g., a MAC CE) to adjust the UL timing advance for the subsequent data transmission. For example, a timing advance command may be transmitted via an RAR message or one or more MAC CEs in the subsequent DL packets to the UE. In such a case, the UE may maintain and/or updated an $N_{TA, RA-SDT}$ during the RA-SDT procedure by referring the one or more received timing advance commands during the SDT procedure.

It should be noted that, in the present disclosure, $N_{TA, SDT}$ is used to represent $N_{TA, RA-SDT}$ or $N_{TA, CG-SDT}$ on the UE side. In addition, it is possible that the UE may maintain an $N_{TA, SDT}$ during a CG-SDT procedure. As such, the $N_{TA, SDT}$ is also a $N_{TA, CG-SDT}$ during the CG-SDT procedure. The UE may maintain the same $N_{TA, SDT}$ during the following RA-SDT procedure. As such, the $N_{TA, SDT}$ is also a $N_{TA, RA-SDT}$ during the RA-SDT procedure and vice versa. This may happen while the UE is configured or enabled to initiate a CG-SDT procedure and a RA-SDT procedure for small data transmissions. In addition, the validity of the $N_{TA, SDT}$ is associated with the counting SDT-TAT. For example, the $N_{TA, SDT}$ is valid while the timer SDT-TAT is still counting. In addition, the UE may re-start the SDT-TAT by re-configuring the SDT-TAT to its initial value while the UE receives a timing advance command (e.g., via an RAR message or via a MAC CE) from the serving cell. The $N_{TA, SDT}$ may become invalid after the SDT-TAT expires. It should be noted that, the stored $N_{TA, SDT}$ value may also be valid after an SDT procedure is terminated or finished. For example, the SDT-TAT may still be counting after the SDT procedure is terminated.

It should be noted that, UE may also update the $N_{TA, SDT}$ during a non-SDT procedure. For example, the serving cell of the UE may transmit timing advance command during an RRC procedure, such as a RAN Notification Area Update procedure, an RRC Resume procedure, an SI on-demand procedure, via an RAR message or a MAC CE(s).

In one implementation of the present disclosure, a UE may apply $N_{TA, SDT}$ for SL packet exchange while the SDT-TAT is counting. In the present implementation, a UE may transmit/receive SL packets based on the UL timing advance for SDT (e.g., $N_{TA, SDT}$) directly while the UE have a valid $N_{TA, SDT}$ value. For example, the UE may configure the $N_{TA, SL}$ value to be the $N_{TA, SDT}$ value (i.e., $N_{TA, SL} = N_{TA, SDT}$) for SL packet transmission/reception while the SDT-TAT is still counting.

In some further implementations, the UE may transmit or receive SL packets by setting a default $N_{TA, SL}$ value if the SDT-TAT expires which may render the stored $N_{TA, SDT}$ value invalid. For example, the UE may set $N_{TA, SL}$ to be zero (i.e., $N_{TA, SL} = 0$) or a default value decided based on the 3GPP technical specifications.

In one implementation of the present disclosure, a UE may decide whether to apply $N_{TA, SDT}$ for SL packet exchange while the SDT-TAT is counting. In the present implementation, a UE may decide whether to apply an $N_{TA, SDT}$ for SL packet exchange while the SDT-TAT is counting if the UE has a stored (and valid) $N_{TA, SDT}$ value. In some implementations, whether to apply an $N_{TA, SDT}$ for SL packet transmissions/receptions may be left to UE implementations. In some other implementations, a UE may be configured with specific rules (e.g., DL-RSRP thresholds) for the UE to decide whether to apply $N_{TA, SDT}$ or conventional $N_{TA, SL}$. For example, the UE may apply an $N_{TA, SDT}$ by comparing a DL-RSRP value to a given DL-RSRP threshold. Otherwise, the UE may apply a conventional $N_{TA, SL}$ when the DL-RSRP is higher/lower than the given DL-RSRP threshold. For the case that a DL-RSRP measurement result is equal to DL-RSRP threshold, it may be left to the UE implementation to decide whether to apply the stored $N_{TA, SDT}$ or (conventional) $N_{TA, SL}$ for the SL packet exchange.

It should be noted that, in some implementations, the UE may configure $N_{TA, SL}$=(updated) $N_{TA, SDT}$ directly once the $N_{TA, SDT}$ is updated during an SDT procedure.

In some implementations, the UE may transmit or receive SL packets based on the UL timing advance for SDT (e.g., $N_{TA, SDT}$) directly while the UE have a valid $N_{TA, SDT}$ value (e.g., when the SDT-TAT is still counting).

In some further implementations, the UE may transmit/receive SL packets by setting a default $N_{TA, SL}$ (e.g., by setting $N_{TA, SL}$=0 or a default value decided by the UE based on the conventional 3GPP Release-16 technical specifications) if the SDT-TAT expires (and so the stored $N_{TA, SDT}$ value may become invalid).

It should be noted that, in some implementations, the UE may apply an updated UL timing relationship (e.g., a $N_{TA, SDT}$ value) on an SL frequency carrier (e.g., an NR SL frequency carrier), which may be a serving frequency carrier or a non-serving frequency carrier, to support NR SL services or NR-V2X services.

In some further implementations, the UE may apply an updated UL timing relationship (e.g., a $N_{TA, SDT}$ value) on an SL frequency carrier (e.g., an E-UTRA SL frequency carrier), which may be a serving frequency carrier or a non-serving frequency carrier, to support E-UTRA SL services or E-UTRA-V2X services. For example, when an NR/E-UTRA serving cell also supports E-UTRA V2X SL communication services or E-UTRA SL (communication/discovery) services, the UE may apply an updated UL timing relationship (e.g., a $N_{TA, SDT}$ value) on an E-UTRA SL frequency carrier.

In one implementation of the present disclosure, an SL timing advance may be adjusted during an active SDT procedure. In the present implementation, a UE may obtain a UL timing offset (e.g., a $N_{TA, offset}$ value) from a serving cell during an SDT procedure (e.g., a CG-SDT procedure or a RA-SDT procedure). During the SDT procedure, the UE may also implement an SL data exchange on a serving frequency carrier (which supports one or more of NR SL services, NR-V2X services, E-UTRA V2X services, E-UTRA SL services, and E-UTRA ProSe services) and/or a non-serving frequency carrier.

In some implementations, after receiving an updated $N_{TA, offset}$ value from the serving cell for an active SDT procedure (e.g., via broadcast system information). The UE also may apply the updated $N_{TA, offset}$ value to the SL timing advance adjustment by jointly considering the SL timing, $(N_{TA, SL} + N_{TA, offset}) \cdot T_c$.

In some other implementations, the UE may keep the $N_{TA, SL}$ value by referring to the $N_{TA}$ value, which is the UL timing advance value maintained during an active CG-SDT/RA-SDT procedure. However, in some other implementations, it is possible that the UE may not be able to update the $N_{TA, SDT}$ value immediately. In such a case, the UE may try to align or equate the $N_{TA, SL}$ value with the $N_{TA}$ value (e.g., the $N_{TA, SDT}$ value) after a processing latency. For example, in a PC5 interface (e.g., an E-UTRA/NR PC5 interface), the UE may configure the value of $N_{TA, SL}$ to be an updated $N_{TA}$ value after a processing time, when the $N_{TA}$ value is updated in an (E-UTRA/NR) Uu interface during an SDT procedure or a non-SDT procedure.

It should be noted that, in some implementations, the processing time may be pre-defined in the 3GPP technical specification. In some other implementations, the processing time may be requested/configured by the serving cell (e.g., via broadcasting system information or UE-specific downlink control signaling, such as RRC signaling). In some additional implementations, the processing time depends on the UE (hardware/software) capability and so the UE may also deliver the processing time on during the UE capability enquiry procedure. In some additional implementations, the UE may report the processing time latency as part of the UE SL assistance information to the serving cell.

It should be noted that, in some implementations, a processing time may be generated due to a UE's ability to adjust the SL timing in the beginning of the next SL transmission, which may be decided based on the downlink frame structure and the UE capabilities. So, when the $N_{TA}$ or $N_{TA, SDT}$ value is updated during a (DL/UL/SL) symbol/time slot/subframe/radio frame, the UE may be able to update the SL timing advance (e.g., by configuring $N_{TA,SL} = N_{TA,SDT}$) only in the beginning of the next (DL/UL/SL) symbol/time slot/subframe/radio frame.

It should be noted that, due to the impact of processing time and (DL/UL/SL) radio frame structure, when the $N_{TA}$ or $N_{TA,SDT}$ value is updated during a symbol/time slot/subframe/radio frame, a UE may be able to update the SL timing advance (e.g., by configuring $N_{TA,SL}$=(updated) $N_{TA,SDT}$) only in the beginning of the next N symbol/N time slot/subframe/radio frame, where the value of N may be pre-defined in the 3GPP technical specifications or configured by the serving RAN.

Thus, the UE may start to apply $N_{TA,SL}$=(updated) $N_{TA,SDT}$ on the first SL packet transmission after the given processing time.

It should be noted that, if the $N_{TA,SDT}$ value is updated while an SL packet is transmitting, which may include the SL packet repetitions for the same SL packet, the UE may not apply $N_{TA,SL} = N_{TA,SDT}$ immediately on the on-going SL packet transmission/repetition. Instead, the UE may start SL packet transmission (by configuring $N_{TA,SL}$=(updated) $N_{TA,SDT}$) in the next SL packet transmission(s) with or without a given processing time.

In one implementation of the present disclosure, a UE may transmit or receive SL packets on serving frequency carriers and non-serving frequency carriers. In the present implementation, when a UE is transmitting or receiving SL packets on multiple SL frequency carriers (e.g., any combinations of serving frequency carriers of the special cell/secondary cells and non-serving frequency carriers), the UE may apply a stored $N_{TA, SDT}$ value to all of the SL frequency carriers that the UE is implementing SL packet transmission/reception. The special cell may be the primary cell of a master cell group or a primary secondary cell of a secondary cell group.

In some implementations, the UE may apply the $N_{TA, SDT}$ value as the timing reference for SL packet transmission/reception only on the serving frequency carrier (e.g., serving frequency carrier of the special cell/secondary cells). In some other implementations, the UE may apply the $N_{TA, SDT}$ value as the timing reference for SL packet transmission/reception only on the primary serving frequency carrier (e.g., the serving frequency carrier of the primary cell).

In contrast, in some implementations, the UE may apply $N_{TA, SL}=0$ as the timing reference for SL packet transmission/reception on the non-serving frequency carrier (e.g., no PCell/PSCell/SCell operates on the concerned SL frequency carrier).

In some implementations, the UE may apply an $N_{TA, SDT}$ value as the timing reference for SL packet transmission/reception only on one UL carrier that is associated with a (DL) primary serving frequency carrier (e.g., a NUL or SUL carrier). In some further implementations, the UE may apply an $N_{TA, SDT}$ value as the timing reference for SL packet transmission/reception on both of the NUL and SUL carriers associated with the (DL) primary serving frequency carrier, when the UE is implementing SL packet transmission/reception on both of the NUL and SUL carriers jointly and/or simultaneously.

Figure 15:
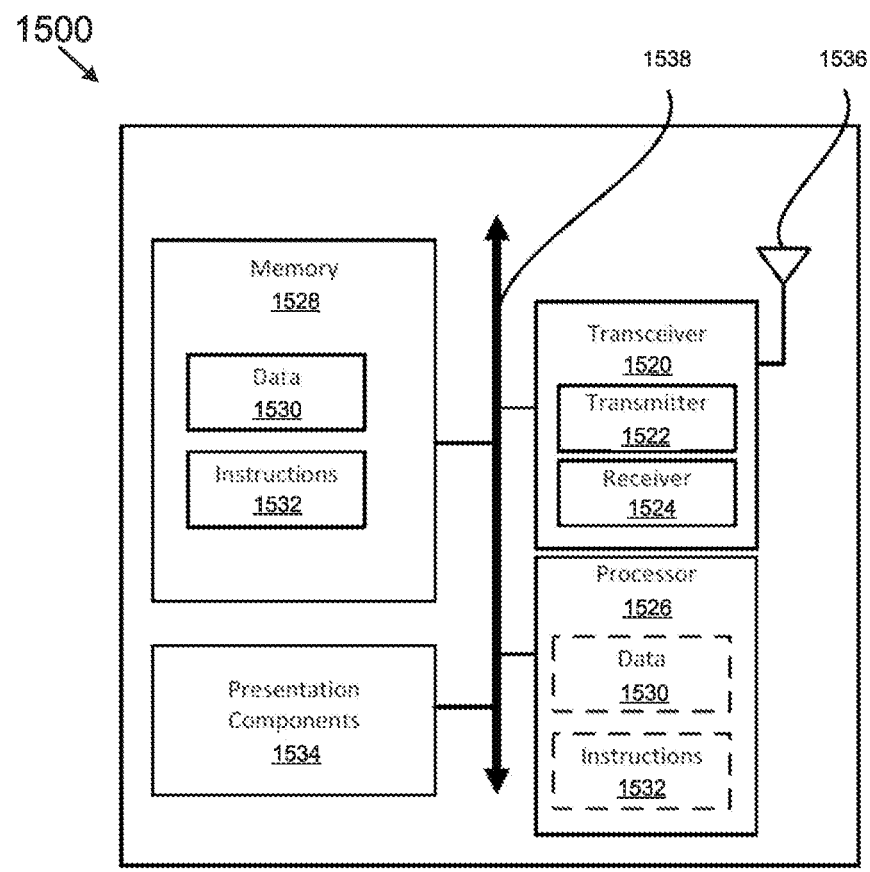
FIG. 15 illustrates a block diagram of a node for wireless communication, according to an example embodiment of the present disclosure.

In some implementations of the present disclosure, the method and functions described with reference to FIGS. 1-14 may be implemented in a node. FIG. 15 is a block diagram illustrating a node 1500 for wireless communication, according to one example implementation of the present disclosure. As shown in FIG. 15, the node 1500 may include a transceiver 1520, a processor 1526, a memory 1528, one or more presentation components 1534, and at least one antenna 1536. The node 1500 may also include a Radio Frequency (RF) spectrum band module, a base station communications module, a network communications module, and a system communications management module, input/output (I/O) ports, I/O components, and a power supply (not explicitly shown in FIG. 15) in which each of the components above may be in communication with each other, directly or indirectly, over one or more buses 1538.

The transceiver 1520 may include a transmitter 1522 and a receiver 1524 configured to transmit and/or receive time and/or frequency resource partitioning information. In some implementations, the transceiver 1520 may be configured to transmit in different types of subframes and slots including, but not limited to, usable, non-usable and flexibly usable subframes and slot formats. The transceiver 1520 may be configured to receive data and control signaling.

The node 1500 may include a variety of computer-readable media. Computer-readable media may be any available media accessible by the node 1500 and include both volatile and non-volatile media, removable and non-removable media. By way of example, and not limitation, computer-readable media may include computer storage media and communication media. Computer storage media may include both volatile and non-volatile, removable and non-removable media implemented in any method or technology for storage of information, such as computer-readable instructions, data structures, program modules or other data.

Computer storage media may include RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media do not include a propagated data signal. Communication media may embody computer-readable instructions, data structures, program modules or other data in a modulated data signal such as a carrier wave or other transport mechanism and includes any information delivery media. The term "modulated data signal" may be a signal that has one or more of its characteristics set or changed in such a manner as to encode information in the signal. By way of example, and not limitation, communication media may include wired media such as a wired network or direct-wired connection, and wireless media such as acoustic, RF, infra-red and other wireless media. Combinations of any of the above should also be included within the scope of computer-readable media.

The memory 1528 may include computer-storage media in the form of volatile and/or non-volatile memory. The memory 1528 may be removable, non-removable, or a combination thereof. Exemplary memory may include solid-state memory, hard drives, optical-disc drives, etc. As illustrated in FIG. 15, the memory 1528 may store computer-readable, computer-executable instructions 1532 (e.g., software codes) that are configured to, when executed, cause the processor 1526 to perform various functions described herein, for example, with reference to FIGS. 1 through 14. Alternatively, instructions 1532 may not be directly executable by the processor 1526 but be configured to cause the node 1500 (e.g., when compiled and executed) to perform various functions described herein.

The processor 1526 may include an intelligent hardware device, for example, a central processing unit (CPU), a microcontroller, an ASIC, etc. The processor 1526 may include memory. The processor 1526 may process data 1530 and instructions 1532 received from the memory 1528, and information through the transceiver 1520, the base band communications module, and/or the network communications module. The processor 1526 may also process information to be sent to the transceiver 1520 for transmission through the antenna 1536, and further to the network communications module for transmission to a core network.

The one or more presentation components 1534 may present data indications to a person or other device. For example, the one or more presentation components 1534 may include a display device, speaker, printing component, vibrating component, etc.

From the above description it is manifest that various techniques may be used for implementing the concepts described in the present disclosure without departing from the scope of those concepts. Moreover, while the concepts have been described with specific reference to certain implementations, a person of ordinary skill in the art may recognize that changes may be made in form and detail without departing from the scope of those concepts. As such, the described implementations are to be considered in all respects as illustrative and not restrictive. It should also be understood that the present disclosure is not limited to the particular implementations described above, but many rearrangements, modifications, and substitutions are possible without departing from the scope of the present disclosure.

What is claimed is:

1. A method performed by a user equipment (UE), the method comprising:
    initiating a Small Data Transmission (SDT) procedure for transmitting a first set of data packets to a base station (BS) via an uplink (UL) transmission; and
    determining, while the UE is in a Radio Resource Control (RRC) Inactive state, whether to prioritize the UL transmission over a sidelink (SL) transmission when there is a conflict between the UL transmission and the SL transmission during the SDT procedure,
    wherein the SL transmission is for transmitting a second set of data packets to another UE.

2. The method of claim 1, wherein:
    the SDT procedure is a Configured Grant SDT (CG-SDT) procedure, and
    the UL transmission is transmitted on a configured grant UL or a dynamic grant UL provided by the BS.

3. The method of claim 1, wherein:
    the SDT procedure is a Random Access SDT (RA-SDT) procedure, and
    the UL transmission is transmitted on a 2-step Random Access procedure, a 4-step Random Access procedure, or a dynamic grant UL provided by the BS during the RA-SDT procedure.

4. The method of claim 1, wherein:
    the UL transmission is implemented on an Evolved Universal Terrestrial Radio Access (E-UTRA) Uu interface or a New Radio (NR) Uu interface,
    the SL transmission is implemented on an E-UTRA PC5 interface or an NR PC5 interface, and
    the UE is in an E-UTRA RRC Inactive state or an NR RRC Inactive state.

5. The method of claim 1, wherein determining whether to prioritize the UL transmission over the SL transmission comprises determining to always prioritize the UL transmission over the SL transmission.

6. The method of claim 1, wherein determining whether to prioritize the UL transmission over the SL transmission comprises determining to prioritize the UL transmission over the SL transmission when the UL transmission is a configured grant (CG)-UL transmission.

7. The method of claim 1, further comprising:
    receiving one or more priority thresholds from at least one of the BS and another BS,
    wherein the one or more priority thresholds comprise one or more SL transmission priority thresholds,
    wherein determining whether to prioritize the UL transmission over the SL transmission comprises prioritizing the SL transmission over the UL transmission or prioritizing the UL transmission over the SL transmission based on the one or more SL transmission priority thresholds and a priority value associated with the SL transmission.

8. The method of claim 1, further comprising:
    receiving one or more priority thresholds from at least one of the BS and another BS,
    wherein the one or more priority thresholds comprise one or more UL transmission priority thresholds,
    wherein determining whether to prioritize the UL transmission over the SL transmission comprises prioritizing the SL transmission over the UL transmission or prioritizing the UL transmission over the SL transmission based on the one or more UL transmission priority thresholds and a priority value associated with the UL transmission.

9. The method of claim 1, further comprising:
    receiving one or more priority thresholds from at least one of the BS and another BS,
    wherein the UL transmission comprises a Random Access (RA)-UL transmission,
    wherein determining whether to prioritize the UL transmission over the SL transmission comprises determining whether to prioritize the RA-UL transmission over the SL transmission based on the one or more priority thresholds.

10. The method of claim 1, further comprising:
    receiving one or more priority thresholds from at least one of the BS and another BS,
    wherein the UL transmission comprises a Configured Grant (CG)-UL transmission,
    wherein determining whether to prioritize the UL transmission over the SL transmission comprises determining to prioritize the CG-UL transmission over the SL transmission irrespective of the received one or more priority thresholds.

11. A user equipment (UE), comprising:
    one or more non-transitory computer-readable media storing computer-executable instructions; and
    at least one processor coupled to the one or more non-transitory computer-readable media, and configured to execute the computer-executable instructions to:
        initiate a Small Data Transmission (SDT) procedure for transmitting a first set of data packets to a base station (BS) via an uplink (UL) transmission; and
        determine, while the UE is in a Radio Resource Control (RRC) Inactive state, whether to prioritize the UL transmission over a sidelink (SL) transmission when there is a conflict between the UL transmission and the SL transmission during the SDT procedure,
    wherein the SL transmission is for transmitting a second set of data packets to another UE.

12. The UE of claim 11, wherein:
    the SDT procedure is a Configured Grant SDT (CG-SDT) procedure, and
    the UL transmission is transmitted on a configured grant UL or a dynamic grant UL provided by the BS.

13. The UE of claim 11, wherein:
    the SDT procedure is a Random Access SDT (RA-SDT) procedure, and
    the UL transmission is transmitted on a 2-step Random Access procedure, a 4-step Random Access procedure, or a dynamic grant UL provided by the BS during the RA-SDT procedure.

14. The UE of claim 11, wherein:
    the UL transmission is implemented on an Evolved Universal Terrestrial Radio Access (E-UTRA) Uu interface or a New Radio (NR) Uu interface,
    the SL transmission is implemented on an E-UTRA PC5 interface or an NR PC5 interface, and
    the UE is in an E-UTRA RRC Inactive state or an NR RRC Inactive state.

15. The UE of claim 11, wherein determining whether to prioritize the UL transmission over the SL transmission comprises determining to always prioritize the UL transmission over the SL transmission.

16. The UE of claim 11, wherein determining whether to prioritize the UL transmission over the SL transmission comprises determining to prioritize the UL transmission over the SL transmission when the UL transmission is a configured grant (CG)-UL transmission.

17. The UE of claim 11, wherein the at least one processor is further configured to execute the computer-executable instructions to:

receive one or more priority thresholds from at least one of the BS and another BS,
wherein the one or more priority thresholds comprise one or more SL transmission priority thresholds,
wherein determining whether to prioritize the UL transmission over the SL transmission comprises prioritizing the SL transmission over the UL transmission or prioritizing the UL transmission over the SL transmission based on the one or more SL transmission priority thresholds and a priority value associated with the SL transmission.

18. The UE of claim 11, wherein the at least one processor is further configured to execute the computer-executable instructions to:
receive one or more priority thresholds from at least one of the BS and another BS,
wherein the one or more priority thresholds comprise one or more UL transmission priority thresholds,
wherein determining whether to prioritize the UL transmission over the SL transmission comprises prioritizing the SL transmission over the UL transmission or prioritizing the UL transmission over the SL transmission based on the one or more UL transmission priority thresholds and a priority value associated with the UL transmission.

19. The UE of claim 11, wherein the at least one processor is further configured to execute the computer-executable instructions to:
receive one or more priority thresholds from at least one of the BS and another BS,
wherein the UL transmission comprises a Random Access (RA)-UL transmission,
wherein determining whether to prioritize the UL transmission over the SL transmission comprises determining whether to prioritize the RA-UL transmission over the SL transmission based on the one or more priority thresholds.

20. The UE of claim 11, wherein the at least one processor is further configured to execute the computer-executable instructions to:
receive one or more priority thresholds from at least one of the BS and another BS,
wherein the UL transmission comprises a Configured Grant (CG)-UL transmission;
wherein determining whether to prioritize the UL transmission over the SL transmission comprises determining to prioritize the CG-UL transmission over the SL transmission irrespective of the received one or more priority thresholds.

\* \* \* \* \*